(12) United States Patent
Kubota et al.

(10) Patent No.: US 7,307,991 B2
(45) Date of Patent: Dec. 11, 2007

(54) MPLS NETWORK SYSTEM

(75) Inventors: Makoto Kubota, Kawasaki (JP);
Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1048 days.

(21) Appl. No.: 10/346,036

(22) Filed: Jan. 16, 2003

(65) Prior Publication Data
US 2003/0142669 A1 Jul. 31, 2003

(30) Foreign Application Priority Data
Jan. 18, 2002 (JP) ............... 2002-009979

(51) Int. Cl.
*H04L 12/56* (2006.01)
(52) U.S. Cl. ..................... 370/392; 370/475
(58) Field of Classification Search ................ 370/392, 370/393, 475
See application file for complete search history.

(56) References Cited

U.S. PATENT DOCUMENTS 7,075,932 B2 * 7/2006 Matsuhira et al. ..... 370/395.31
7,079,544 B2 * 7/2006 Wakayama et al. ......... 370/401
2003/0225907 A1 * 12/2003 Krishnan .................... 709/238

FOREIGN PATENT DOCUMENTS

JP    2000-138710    5/2000

* cited by examiner

*Primary Examiner*—Melvin Marcelo
(74) *Attorney, Agent, or Firm*—Katten Muchin Rosenman LLP

(57) ABSTRACT

A first edge node in an MPLS network system includes a generation module generating a key value for determining an allocating destination link in a way that uses, as input values, a piece of source identifying information and a piece of destination identifying information contained in a header of a forwarding target frame before being attached with an MPLS header enabling the frame to be forwarded across an MPLS network on the basis of an MPLS protocol, an embedding module embedding the key value generated by the generation module into a specified field in the MPLS header, and a transmitting module transmitting the MPLS frame containing the key value embedded into the specified field in its MPLS header to the MPLS network.

31 Claims, 19 Drawing Sheets

1 MPLS NETWORK SYSTEM

| INTERFACE NUMBER | VPN |
|---|---|
| 0 | 0 |
| 1 | 1 |

71

(b)

| INTERFACE NUMBER | VPN |
|---|---|
| 0 | 0 |
| 1 | 1 |

| VPN | DESTINATION IP PREFIX | FORWARDING LABEL | LAYER 3 ADDRESS OF DESTINATION EDGE NODE |
|---|---|---|---|
| 1 | USER NETWORK 3 | α | EDGE NODE 3 |
| | | | |

(b)

82

| VPN | DESTINATION IP PREFIX | FORWARDING LABEL | LAYER 3 ADDRESS OF DESTINATION EDGE NODE |
|---|---|---|---|
| 1 | USER NETWORK 3 | α | EDGE NODE 3 |
| | | | |

| DESTINATION IP PREFIX | FORWARDING LABEL | OUTPUT INTERFACE |
|---|---|---|
| EDGE NODE 3 | 150 | o |
|  |  |  |

91

(b)

| DESTINATION IP PREFIX | FORWARDING LABEL | OUTPUT INTERFACE |
|---|---|---|
| EDGE NODE 3 | 150 | o |
|  |  |  |

| RECEIVING LABEL | FORWARDING LABEL | OUTPUT INTERFACE |
|---|---|---|
| α | REMOVAL | o |
|  |  |  |

| LOGICAL INTERFACE | CALCULATION KEY VALUE | PHYSICAL INTERFACE |
|---|---|---|
| o | "00" | o−0 |
| o | "01" | o−1 |
| o | "10" | o−2 |
| o | "11" | o−3 |

| LOGICAL INTERFACE | CALCULATION KEY VALUE | PHYSICAL INTERFACE |
|---|---|---|
| 0 | "000" | 0-0 |
| 0 | "001" | 0-1 |
| 0 | "010" | 0-2 |
| 0 | "011" | 0-3 |
| 0 | "100" | 0-4 |
| 0 | "101" | 0-5 |
| 0 | "110" | 0-6 |
| 0 | "111" | 0-7 |

181

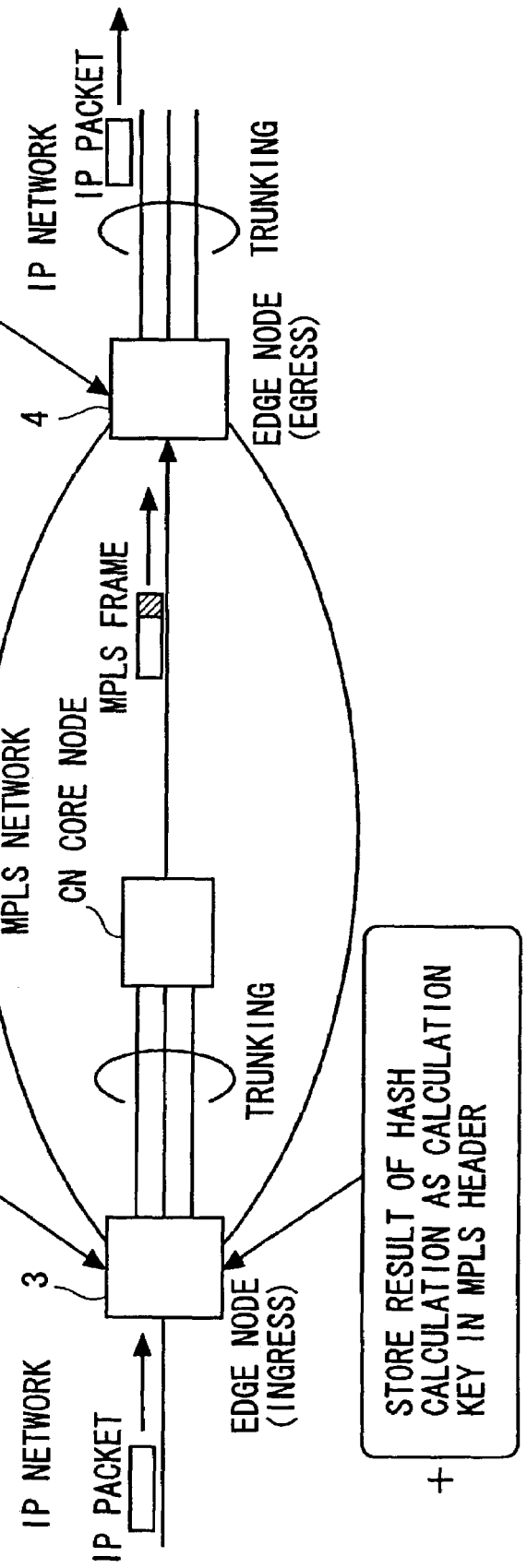

MPLS NETWORK SYSTEM

BACKGROUND OF THE INVENTION

The present invention relates generally to a communication device for allocating packets to a plurality of physical links that are logical bundled, and more particularly to an MPLS (Multi Protocol Label Switching) network system schemed to enhance a load sharing effect without causing a reverse of sequence when allocating the packets to the plurality of physical links bundled as they appear to be one logical link by referring to only headers of MPLS frames in an egress edge node in an MPLS network.

MPLS has been watched with keen interest as a technique of speeding up a packet forwarding process (packet switching process) in an IP (Internet Protocol) network such as the Internet. MPLS is the protocol enabling a forwarding target packet such as an IP packet to be routed based on a 20-bit label attached to this packet inside the MPLS network in a way that assembles an MPLS frame by attaching an MPLS header containing the 20-bit label to the packet.

MPLS enables higher-speed packet routing with timesaving not via the network layer than by normal routing based on a routing table on the network layer, i.e., by routing based on a search for an IP address. Further, MPLS can be utilized as an infrastructure for configuring VPN (Virtual Private Network) and is therefore watched with keen interest by carriers (common carriers or communication service providers) MPLS is expected to spread from now into the future.

Herein, FIG. 1 illustrates how the packet (IP packet) is routed (packet switching) on an MPLS-based network layer. Referring to FIG. 1, in this MPLS network system, provider networks having IP addresses (Prefix) [a] and [d] as user sites are connected to the MPLS network. These provider networks accommodate terminal devices such as personal computers given IP addresses [A] and [D], respectively.

Ingress and egress edge nodes and respective switching nodes (core or internal nodes) within the MPLS network build a label switched path (LSP) in the MPLS network by use of LDP (Label Distribution Protocol) for distributing an MPLS label.

The respective nodes create and retain routing tables (label tables) as shown in FIG. 1. Each of the routing tables retained by the ingress and egress edge nodes is stored with pieces of information such as a destination IP address (Prefix), a forwarding label and a forwarding interface. The routing table retained by each of the switching nodes is stored with pieces of information such as a receiving label, a forwarding label and a forwarding interface.

After building the label switched path, the ingress edge node in the MPLS network forwards to the posterior switching node an MPLS frame (MPLS packet) assembled by attaching an MPLS header containing an IP packet switching label (forwarding label) to the IP packet, and thereafter the forwarding target packet is routed by label switching based on the IP packet switching label down to the egress edge node.

Next, FIG. 2 illustrates network layer protocol-based packet (IP packet) routing in the case of configuring VPN using MPLS. Referring to FIG. 2, in this MPLS network system, user networks having IP addresses (Prefix) [a] and [c] as user sites are connected to the MPLS network. These user networks accommodate terminal devices such as personal computers given IP addresses [A] and [C], respectively.

The ingress edge node, the egress edge node and the respective switching nodes in the MPLS network build an IP packet routing label switched path and a VPN label switched path in the MPLS network by utilizing LDP for distributing the MPLS label and mp-BGP (multiprotocol-Extension Border Gateway Protocol).

The ingress edge node creates and retains a VPN label table as shown in FIG. 2. This VPN label table is created for every VPN, i.e., every virtual path and is stored with pieces of information such as a destination IP address (Prefix), a forwarding label and IP address of a destination edge node.

The respective nodes create and retain routing tables as shown in FIG. 2. The routing table retained by the ingress edge node is stored with pieces of information such as a destination IP address, a forwarding label, and a forwarding interface. Each of the routing tables retained by the respective switching nodes and the egress edge node, is stored with pieces of information such as a receiving label, a forwarding label and a forwarding interface.

After building the label switched path, the ingress edge node in the MPLS network forwards to the posterior switching node an MPLS frame assembled by attaching two pieces of MPLS headers containing an IP packet switching label (forwarding label) and a VPN identifying label to the IP packet, and thereafter the forwarding target packet is routed by label switching based on the IP packet switching label and the VPN identifying label down to the egress edge node.

On the other hand, in the carrier network, it is of importance to increase a capacity of the network and to enhance a reliability, and a variety of existing load sharing techniques are applied for actualizing these targets. What is focussed on here in is "trunking" defined as a technique for load sharing at a physical link level.

Trunking is a generic term of techniques of aggregating a plurality of physical links between adjacent nodes into one logical link. The techniques for attaining this are those depending on vendors, "Link Aggregation" of Ethernet that is defined by IEEE.P802.3ad, and so on.

The following advantages are obtained by utilizing the trunking technique.

(1) The plurality of physical links are bundled, and it is therefore possible to build a larger-capacity link than an upper limit of a transmission speed of one single physical link. (2) Further, if a fault occurs on a certain physical link, the data communications can be performed through the remaining physical links bundled as the logical link, whereby the reliability can be enhanced.

FIG. 3 is an explanatory diagram showing how a frame is forwarded to the plurality of physical links bundled by trunking. Routing modules shown in FIG. 3 are, however, components given because of illustrated nodes #1, #2 being categorized as switching nodes but are not directly related to trunking.

Referring to FIG. 3, there will be explained processes in the respective nodes in the case of forwarding the frame from the node #1 to the node #2. For an explanatory convenience, the discussion starts with touching on a process in a switching phase of the node #1. The routing module is defined as a routing module in bridge on, e.g., Ethernet, and searches a learning table with an in-frame destination MAC address used as a key, thereby determining a destination link.

A calculation key generating module, if the link determined as a destination by this routing module is one of the plurality of physical links (aggregated as one logical link) undergoing trunking, in a forwarding phase, performs a calculation based on a predetermined algorithm by inputting (information in) a header of the frame, and outputs a calculation key.

A link allocating module, based on this calculation key, selects one of the plurality of physical links bundled as one logical link and forwards the frame to this selected physical link.

Next, a process in a receiving phase will be explained. In the node #2 receiving the frame from one of the physical links, a link aggregating module recognizes that the frame is received from the logical link corresponding to the receiving physical link.

Thus, the frame forwarding node #1 allocates the frames, addressed to one logical link, to the plurality of physical links, thereby actualizing the load sharing.

With respect to the algorithm adopted by the calculation key generating module, the following points need to be given heed to. (1) Namely, the traffic is distributed efficiently so that the load concentrates on one physical link among the plurality of candidate physical links. (2) Further, when a series of one-way traffic flowing from the same source to the destination is defined as "flow" in a session of communications performed on every application (e.g., every application layer protocol such as Telnet, FTP (File Transfer Protocol), SMTP (Simple Mail Transfer Protocol) and so on), the calculation keys of the frames belonging to the same flow take the same value so that the frames belonging to one flow are allocated to the same physical link.

The reason for the necessity of considering the heeding point (2) is that if the node #1 forwards the frames belonging to the same flow in distribution to different physical links, the node #2 is unable to recognize that the frames belong to the same flow. As a result, a problem is that the sequence of the frames belonging to the single flow can not be assured in the process of routing. This problem is known as a "reverse of sequence".

What is effective as an approach for allocating the frames while considering the heeding points (1) and (2) described above, may be such a scheme that the algorithm adopted by the calculation key generating module uses, for instance, an irreversible one-way function (e.g., Hash function) using, as inputs, values in source and destination address fields (Mac address in the case of a MAC frame, and source and destination IP addresses in the case of an IP packet (frame)) contained in the frame header, and the link allocating module allocates the frame to any one of the plurality of trunking-target physical links on the basis of the obtained key value (Hash value as a pseudo random number).

In this case, the frames belonging to the same flow are given assurance to be forwarded to the same physical link and are, it follows, properly allocated depending on Hash functions.

A case will be next considered, wherein the MPLS frame undergoes a calculation key generating process and a link allocating process in order to attain trunking described above.

MPLS is at first defined as the protocol enabling (information based on) various categories of protocols to be padded to the tail of the MPLS header. MPLS is further defined as the protocol having such a characteristic and an advantage that the frame attached once with the MPLS label (a packet switching label) can be routed based on only the MPLS header consisting mainly of this label. A value of this label is generally mapped not from a source address but from a destination address in the header of the frame before being attached with the label.

What is herein thought of is a case of generating the calculation key for allocating the MPLS frames to the physical links using the trunking technique. In this case, when generating the calculation key in a way that inputs the MPLS label, the label does not contain a piece of source identifying information, and therefore all the frames belonging to the flow streaming to the same destination come to have the same calculation key, with the result that these frames are allocated to the same physical link.

FIG. 4 is an explanatory view illustrating this problem with the aid of a specific example. FIG. 4 shows an example of architecture of an MPLS network system, wherein VPN is configured between user networks #1, #2, #3 by utilizing MPLS, and a label value α is mapped to and address in the user network #3.

Namely, the label value in the frame is [α] on a label switched path LSP that connects the user network #1 to the user network #3 and on a label switched path LSP that connects the user network #2 to the user network #3. Note that the actual frame, when configuring VPN, flows as the frame attached with two pieces of labels just before an egress edge node as shown in FIG. 2 but is illustrated herein as the MPLS frame attached with one label value in FIG. 4 because of paying attention to only the egress edge node.

In this MPLS network system, when the IP packets are sent from the user networks #1, #2 to the destination user network #3, the respective IP packets are forwarded as the MPLS frames each having the label value a to the egress edge node (the edge node #3) from the ingress edge nodes (the edge nodes #1, #2) in the MPLS network.

IN the egress edge node, when calculating the calculation key for the label value α, a result of this calculation becomes a fixed value a t all times, with the result that all the frames destined for the user network #3 are forwarded to the same physical link (which is, for instance, the physical link, depicted by a bold line, connected to the switching node (a router etc) accommodated in the user network #3 in FIG. 4. This leads to a problem in which the load sharing is not attained.

An approach for obviating this load sharing problem is that the label value of the MPLS frame is mapped not from only the destination identifying information but from both of the source identifying information and the destination identifying information. In this case, however, initially a negotiation may take place for every destination identifying information/label pair on the occasion of building the label switched path, and a traffic for the label distribution increases corresponding to a finer level of mapping. This approach therefore causes a fresh problem.

Another approach to the load sharing problem is that pieces of information in source and destination address fields of a higher-order header than MPLS are used as inputs of the calculation key generating module in the egress edge node in FIG. 4. In this case, however, the egress edge node in the MPLS network needs to distinguish a higher-order protocol than MPLS and extract the source and destination address fields by analyzing the header.

Under such a circumstance that the various categories of protocols can be stacked on MPLS, the problem is that the header analysis per protocol is required, and this process is time-consuming. Further, there is lost the MPLS's fundamental merit that MPLS enables packet routing based on only the MPLS header, and therefore the approach described above has the problem.

SUMMARY OF THE INVENTION

It is a primary object of the present invention to provide a technique of capable of enhancing a load sharing effect without causing a reverse of sequence when an edge node (egress edge node) receiving MPLS frames in an MPLS network allocates packets (frames) to a plurality of physical links bundled as one logical link in a way that refers to only MPLS headers.

To accomplish this object, an edge node according to the present invention belongs to a first network and is connected to a second network or a terminal device via physical links logically bundled, and an ingress edge node belonging to the first network includes a module allocating a packet to the physical link on the basis of a key value calculated based on a packet header and stored in the packet header.

What is considered herein as the first network is, for example, a network such as an MPLS network, an ATM (Asynchronous Transfer Mode) network etc provided by carriers (common carriers or communication service providers). Further, a network considered as the second network is LAN (Local Area Network) serving as a user network and WN (Wide Area Network) as a provider network.

Moreover, an edge node according to the present invention includes a generation module generating a key value for determining an allocating destination link in a way that uses, as input values, a piece of source identifying information and a piece of destination identifying information contained in a header of a forwarding target frame before being attached with an MPLS header enabling the frame to be forwarded across within an MPLS network on the basis of an MPLS protocol, an embedding module embedding the key value generated by the generation module into a specified field in the MPLS header, and a transmitting module transmitting the MPLS frame containing the key value embedded into the specified field in its MPLS header to the MPLS network, an extraction module extracting the key value from the specified field in the MPLS header of the MPLS frame received via the MPLS network, and a determining module determining one physical link as the allocating destination link among a plurality of physical links that are logically bundled beforehand as one link on the basis of the key value extracted by the extraction module.

Further, an MPLS network system according to the present invention includes a first edge node having a generation module generating a key value for determining an allocating destination link in a way that uses, as input values, a piece of source identifying information and a piece of destination identifying information contained in a header of a forwarding target frame before being attached with an MPLS header enabling the frame to be forwarded across within an MPLS network on the basis of an MPLS protocol, an embedding module embedding the key value generated by the generation module into a specified field in the MPLS header, and a transmitting module transmitting the MPLS frame containing the key value embedded into the specified field in its MPLS header to the MPLS network, and a second edge node having an extraction module extracting the key value from the specified field in the MPLS header of the MPLS frame received via the MPLS network, and a determining module determining one physical link as the allocating destination link among a plurality of physical links that are logically bundled beforehand as one link on the basis of the key value extracted by the extraction module.

In this MPLS network system, the generation module in the first edge node may generate, as a key value for determining the allocating destination link, a pseudo random number obtained as a result of performing a calculation using a one-way function in a way that uses, as input values, the source identifying information and the destination identifying information contained in the header of the forwarding target frame.

The first edge node may further have a label attaching module assembling the MPLS frame by attaching, to the forwarding target frame, at least one of a forwarding target frame switching label and a VPN identifying label as the MPLS header used in the MPLS network, and the second edge node may further have a label removal module removing the label attached as the MPLS header to the forwarding target frame.

The embedding module in the first edge node may embed the key value generated by the generation module into a specified field in at least one Shim header as the MPLS header.

The embedding module in the first edge node may embed the key value into a location, having a predetermined length, of the specified field in the Shim header that is rewritable when the MPLS frame is forwarded across within the MPLS network.

The embedding module in the first edge node may embed the key value generated by the generation module into a specified field in one exclusive header as the MPLS header among a plurality of Shim headers.

The second edge node may further have a notifying module notifying the first edge node of an embedded location in the specified field of the MPLS header, into which to embed the key value for determining the allocating destination link, when building a label switched path for the MPLS frame in the MPLS network.

The first edge node may further have a storage module storing the embedding location in the specified field of the MPLS header, into which the key value for determining the notified allocating destination link is embedded.

The determining module in the second edge node may determine one physical link as the allocating destination link among the plurality of physical links that are logically bundled beforehand as one link on the basis of a link value of the key value for determining the allocating destination link that has been extracted by the extraction module and a value obtained from the specified field in the MPLS header.

BRIEF DESCRIPTION OF THE DRAWINGS

The foregoing and other features and advantages of the present invention will become more readily appreciated as the same become better understood by reference to the following detailed description when taken into conjunction with the accompanying drawings wherein:

FIG. 7 is a diagram showing a VPN identifying table in the system in one embodiment of the present invention;

FIG. 8 is a diagram showing a routing table per VPN in the system in one embodiment of the present invention;

FIG. 9 is a diagram showing a routing table for routing the IP packet within an MPLS network in the system in one embodiment of the present invention;

FIG. 10 is a diagram showing a label table in the system in one embodiment of the present invention;

FIG. 11 is a diagram showing a table that maps a calculation key value to a physical interface in the system in one embodiment of the present invention;

FIG. 18 is a diagram showing another example of the table that maps the calculation key value to the physical interface in the system in one embodiment of the present invention;

FIG. 22 is an explanatory view showing a modified example of the basic architecture of the MPLS network system in one embodiment of the present invention.

DETAILED DESCRIPTION OF THE PREFERRED EMBODIMENTS

Next, one embodiment of the present invention will hereinafter be described with reference to the accompanying drawings.

[Example of Basic Architecture of MPLS Network System]

Figure 5:
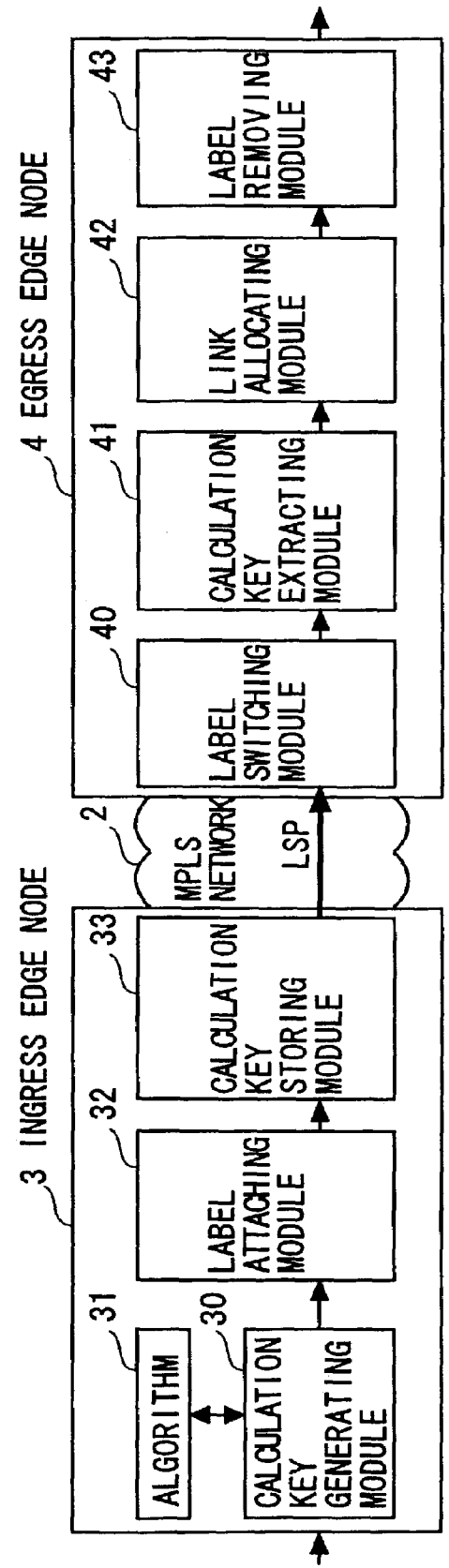
FIG. 5 is a block diagram showing an example of a basic architecture of an MPLS network system in one embodiment of the present invention.

FIG. 5 is a view showing an example of a basic architecture of a system in one embodiment of the present invention. Referring to FIG. 5, an MPLS network system 1 includes an MPLS network 2, an ingress edge node (which might be simply termed an ingress node or an edge node) 3 located in an ingress position of this MPLS network 2, and an egress edge node (which might be simply termed an egress node or an edge node) 3 located in an egress position of the MPLS network 2.

The ingress edge node 3 and the egress edge node 4 receive and forward a packet via a label switched path LSP created in the MPLS network 2. The ingress edge node 3 is connected to an external network as a user site via a physical link. The egress edge node 4 is connected to an external network as a user site via a plurality of a plurality of physical links (that will be aggregated or bundled as they appear one logical link after trunking) undergoing a trunking (link aggregation) technique.

The ingress edge node 3 is constructed of a calculation key generating module (which corresponds to a calculation key creation module according to the present invention) 30, a label attaching module (a label attachment module) 32 and a calculation key storing module (a calculation key storage module) 33.

The calculation key generating module 30, in the ingress edge node 3 in the MPLS network 2, performs a calculation using a one-way function such as a Hash function in a way that uses as input values a piece of source identifying information and a piece of destination identifying information contained in a header of a frame (a forwarding target frame) before being attached with an MPLS header, and generates a calculation key for allocating packets to links (which is called a link allocation), i.e., a key value (a pseudo random number such as a Hash value) for determining a link to which the frame (packet) is allocated. An algorithm 31 is defined as an algorithm used for the calculation key generating module 30 to obtain the calculation key.

The label attaching module 32, in the ingress edge node 3 in the MPLS network 2, assembles an MPLS frame (MPLS packet) by inserting, to a packet (a forwarding target packet) such as an IP packet, header information as an MPLS header that contains at least one of a packet switching label and an VPN identifying label used within the MPLS network 2.

The calculation key storing (embedding) module 33, in the ingress edge node 3 in the MPLS network 2, embeds the calculation key obtained by the calculation key generating module 30 into a specified field within a Shim header as the MPLS header.

The egress edge node 4 is constructed of a label switching module (a label switch module) 40, a calculation key extracting module (a calculation key extraction module) 41, a link allocating module (a link allocation module) 42, and a label removing module (label removal module) 43.

The label switching module 40, in the egress edge node 4 in the MPLS network 2, acquires pieces of information about a frame forwarding interface and about a label used when forwarding the frame on the basis of a label value contained in the MPLS header.

The calculation key extracting module 41, in the egress edge node 4 in the MPLS network 2, extracts a key value from the specified field in the MPLS header.

The link allocating module 42, in the egress edge node 4 in the MPLS network 2, selects and determined one destination physical link among the plurality of physical links bundled by the trunking technique on the basis of the key value extracted by the calculation key extracting module 41.

The label removing module 43, in the egress edge node 4 in the MPLS network 2, removes from the packet such as the IP packet the header information, as an MPLS header, containing at least one of the packet switching label and the VPN identifying label in the MPLS network 2.

In the ingress edge node 3 in the MPLS network 2, the calculation key generating module 30 acquires a key value (which might be referred to as a calculation key value) for determining a link to which the frame (packet) is allocated, wherein the source identifying information and the destination identifying information contained in the header of the frame before being attached with the MPLS header, are used as input values.

The label attaching module 32 attaches the MPLS header to a forwarding target frame, and further the calculation key storing module 33 embeds the key value into the MPLS header. The ingress edge node 3 forwards the thus assembled MPLS frame to the label switched path LSP.

In the egress edge node 4 in the MPLS network 2 which has received the MPLS header attached frame via the label switched path LSP, the label switching module 40 determines a frame forwarding interface and also determines that the MPLS header be removed when forwarding the frame. Thereafter, the calculation key extracting module 41 extracts the key value from the MPLS header.

The link allocating module 42 selects and determines, based on this key value, one destination physical link among the plurality of physical links bundled by trunking. The egress edge node 4 forwards, to the selected physical link, the forwarding target frame from which the MPLS header is removed by the label removing module 43.

Note that in the actual MPLS network system 1, the ingress edge node 3 and the egress edge node 4 are configured including all the components of the other edge node with respect to each other in order to process the packet in a reverse forwarding direction.

According to the example of the basic architecture described above, in the MPLS network system 1, though not illustrated, at least one switching node (which may be known as an internal node or a core node) is located in a relay position between the ingress edge node 3 and the egress edge node 4. As will be explained later on, however, it is possible to take an architecture wherein not a single switching node is located in the relay position between the ingress edge node 3 and the egress edge node 4.

This switching node routes (determines a next-hop of) the MPLS frame down to the egress edge node 4 on the basis of an MPLS frame forwarding process (of forwarding a packet as the MPLS frame by referring to only the packet switching label) by a label switching module (not illustrated). Further, as will be described later on, the switching node may take the same configuration as that of the egress edge node 4.

[First Specific Example of MPLS Network System]

Next, a first specific example of the MPLS network system will be explained with reference to FIGS. 6 through 12 in combination. Note that in each of the specific examples which will hereinafter be explained, a receiving phase in each node is not directly related to the present invention, and therefore its explanation is omitted.

Figure 6:
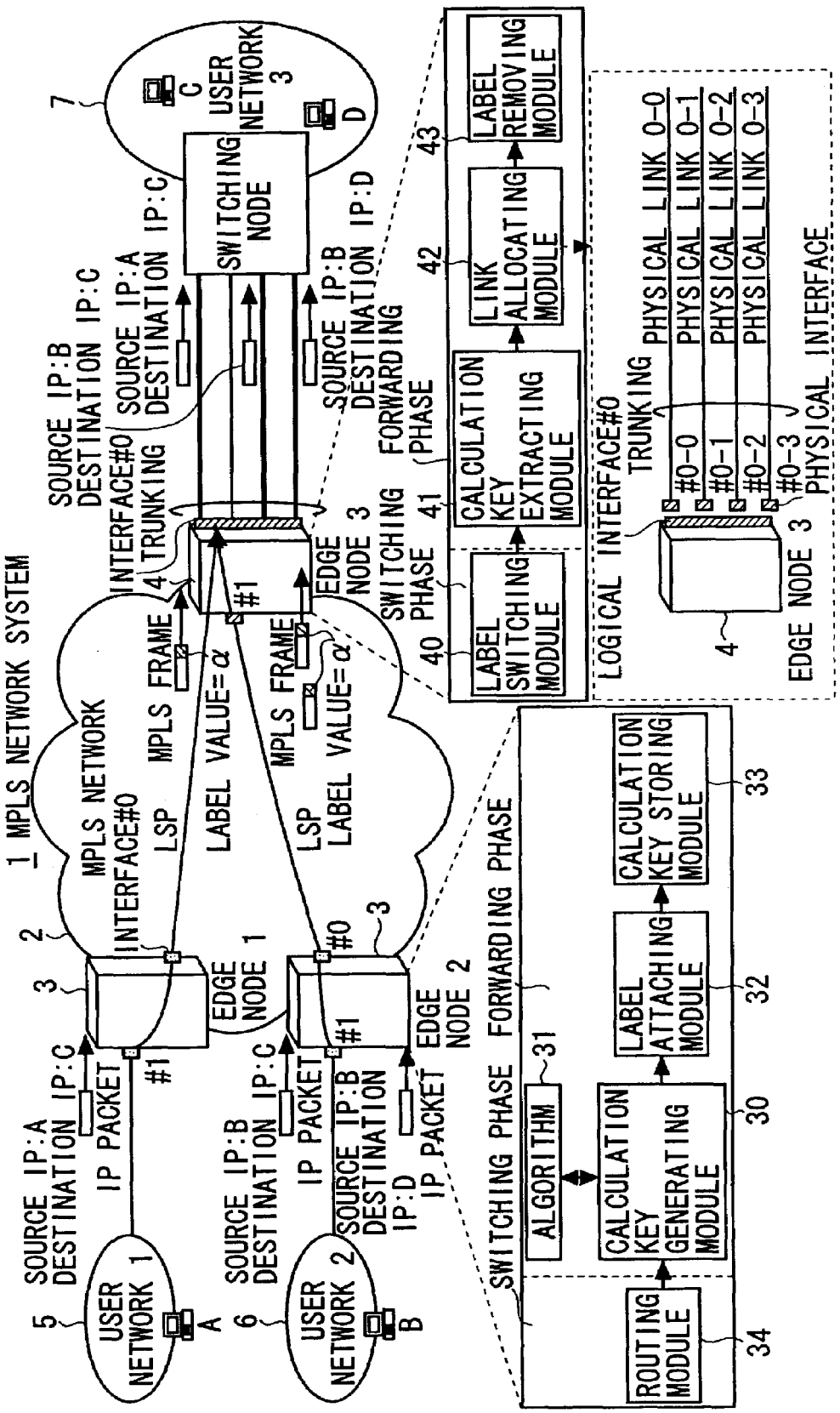
FIG. 6 is a block diagram showing a first specific example of the MPLS network system in one embodiment of the present invention.

The discussion will at first touch on an architecture of VPN built in the MPLS network system. FIG. 6 shows an example in which VPN is built based on MPLS between a user network (#1) 5, a user network (#2) 6 and a user network (#3) 7, and a label value α is mapped to an address in the user network 7. To be more specific, on the label switched path LSP that connects the user network 5 to the user network 7 and on the label switched path LSP that connects the user network 6 to the user network 7, the label value contained in the MPLS header of the MPLS frame is [α].

Subsequently, the discussion will be focused on an operation starting with a process that the edge node (#1, #2) 3 located in the ingress position of the MPLS network 2 attaches the MPLS header to the IP packet and thus forwards the packet as the MPLS frame, and ending with a process that the edge node (#3) 4 located in the egress position of the MPLS network 2 which has received this MPLS frame, allocates the IP packet to one of the plurality of physical links aggregated by trunking in a way that refers to only the MPLS header.

To begin with, an assumption is that the ingress edge node (#1) 3 receives the IP packet transmitted from a terminal device A accommodated in the user network 5.

Next, a routing module 34 determines, based on a VPN identifying table 71 (see FIG. 7), VPN (VPN number: 1) mapping to a receiving interface (interface number: 1).

The routing module 34 acquires, based on a VPN routing table 81 (see FIG. 8), a VPN identifying label value (forwarding label) α and an IP address (layer 3 address) of the destination edge node, which respectively map to a destination IP address (Prefix) [C] contained in the IP packet. In this case, the IP address of he edge node (#3) 4 is obtained as the IP address of the destination edge node.

The routing module 34 acquires, based on a routing table 91 (see FIG. 9) for routing within the MPLS network 2, an IP packet switching label (forwarding label: 150) used within the MPLS network 2 for forwarding the frame (packet) to an IP address of a destination edge node (#3) 4, and also an output interface (interface number: 0).

Next, the calculation key generating module 30 extracts a source IP address [A] and a destination IP address [C] contained in the IP packet received from the routing module 34, and calculates, based on the algorithm 31, a key value for determining the link to which the frame (packet) allocated. Herein, the algorithm 31 is exemplified, wherein the algorithm (using the Hash function) is, it is assumed, such that each of the 32-bit source IP address and the 32-bit destination IP address is delimited by 2 bits, the an exclusive OR thereof is computed, and, as a result of the calculation, a 2-bit value [00] is acquired as a calculation key.

The label attaching module 32 attaches two pieces of MPLS headers (each consisting of 4 bytes) to the IP packet structured of an IP header (20 bytes) and data. FIG. 12(a) shows a format of the MPLS frame into which the IP packet is encapsulated by attaching a Shim header as an MPLS header containing the VPN identifying label. FIG. 12(b) shows a format of the MPLS frame assembled by further inserting (stacking), to the MPLS frame shown in FIG. 12(a), the Shim header containing an IP packet switching label used within the MPLS network 2. FIG. 12(c) shows a format of the Shim header as the MPLS header used in Ethernet and PPP (Point-to-Point Protocol).

Note that the format of the MPLS frame may contain header formats used when applying MPLS on various categories of protocols as used by, e.g., ATM and so on, and also formats after being encapsulated, however, these formats are not directly related to the present invention and are therefore outlined herein.

The calculation key storing module 33 further embeds the above calculation key (2 bits in this example) into the specified field in the MPLS header of the MPLS frame attached with the MPLS header. A field position and a field length of an embedding destination field are arbitrarily selectable beforehand, however, the calculation key is embedded into high-order 2 bits, as the embedding destination field, of the field stored with the VPN identifying label.

FIG. 12(d) shows a format of the MPLS frame after the calculation key has been embedded. In this example shown in FIG. 12(d), a 2-bit location of the 20-bit label field in the second shim header is used for embedding the 2-bit calculation key, and hence the VPN identifying label needs to be a value that can be expressed within 18 bits.

The MPLS frame assembled by the process described above in the ingress edge node (#1) 3, is routed to an unillustrated switching node across the label switched path LSP, and further routed down to the egress edge node 4 on the basis of an MPLS frame switching process (of forwarding the MPLS frame by referring to only the IP packet switching label) by the label switching module.

FIG. 12(e) shows a format of the MPLS frame received by the egress edge node 4 on the basis of this routing process. The first Shim header containing the IP packet switching label of the MPLS frame is rewritten by label swapping (label switching) and a TTL (Time-To-Live) decrement in the switching node in the MPLS network 2, and the MPLS frame is thus routed. The VPN identifying label field of the MPLS frame is, however, provided within the second Shim header, and therefore it does not happen that the key value of the calculation key embedded into the VPN identifying label field is rewritten in the switching node in the MPLS network 2.

The first Shim header containing this IP packet switching label is removed juste before the egress edge node 4 on the basis of the normal MPLS switching process, and at this point of time the frame format changes from the format in FIG. 12(d) to the format in FIG. 12(e).

In the egress edge node 4 receiving the MPLS frame formatted as shown in FIG. 12(e) via the label switched path LSP, the label switching module 40 obtains respective pieces of information about and output label (forwarding label) and an output interface by referring to a label table 101 (see FIG. 10). In this example, the output label information is [label removal], and the output interface number (information) is [logical interface #0], respectively.

The calculation key extracting module 41 extracts a calculation key value [00] from the high-order 2-bit location of the label field stored with the VPN identifying label. The calculation key is stored in this 2-bit location, which presumes that the key value is statically determined in the system as a whole, however, the key value may also be determined dynamically by some negotiations between the nodes. A specific example of an algorithm for dynamically determining the calculation key storage location will hereinafter be described in detail.

After the calculation key extracting module 41 has extracted the calculation key, the link allocating module 42 determines as an output destination a physical interface mapping to the calculation key among the plurality of physical interfaces #0-0 through #0-3 defined as output interfaces corresponding to a single logical interface #0.

Herein, the link allocating module 42 includes a table 111 that maps the calculation key value to the physical interface for every logical interface as shown in FIG. 11. The link allocating module 42 therefore determines the physical interface #0-0 as the output destination as a result of referring to the table 111 on the basis of the calculation key value [00].

Subsequently, the label removing module 43 removes the Shim header as the MPLS header from the MPLS frame, and forwards the IP packet containing the source IP address [A] and the destination IP address [C] toward the physical interface #0-0. As a result, the IP packet forwarded from the egress edge node 4 flows across the physical link #0-0 and is routed via the switching node (a router etc) in the user network 7 to a terminal device C accommodated in the user network 7.

In the switching node (within the user network 7) as a next hop from the egress edge node 4, upon receiving the frame from one of the existing physical links, the link aggregating module touched in the discussion on the priori art recognizes that the frame is received from the single logical link including (corresponding to) the frame receiving physical link.

The egress edge node 4, through the process described above, allocates the MPLS frame forwarded from the ingress edge node (#1) 3 as the IP packet to one physical link among the plurality of physical links aggregated by the trunking technique.

In the MPLS network system 1, an operation of forwarding the frame from the ingress edge node (#2) 3 to the egress edge node 4 is basically the same, however, the source and destination IP addresses contained in two pieces of IP packets received by the ingress edge node (#2) 3 from the user network 6 are different from values contained in the IP packet received by the ingress edge node (#1) 3 described above, and hence the IP packet allocation target physical links in the egress edge node 4 are different from those in the case described above.

Next, this operation will be explained. When the ingress edge node (#2) 3 receives the two IP packets sent from a terminal device B accommodated in the user network 6, the routing module 34 judges VPN (VPN number: 1) mapping to the packet receiving interface (interface number: 1) on the basis of a VPN identifying table 72 (see FIG. 7).

Next, the routing module 34 obtains, from a VPN routing table 82 (see FIG. 8), a VPN identifying label (forwarding label) α and a destination edge node IP address (layer 3 address) that map to a destination IP address (Prefix) contained in the IP packet.

The routing module 34 acquires, based on a routing table 92 (see FIG. 9) for routing the IP packet across the MPLS network 2, an IP packet switching label (forwarding label: 150) for forwarding the frame (packet) to the IP address of the destination edge node (#3) 4 and an output interface (output interface number: 0).

The calculation key generating module 30, based on the algorithm 31, extracts the source IP address [B] and the destination addresses [C], [D] contained in the IP headers, then delimits the whole bits by 2 bits and takes Exclusive OR thereof. Further, the calculation key generating module 30 outputs [10] as a calculation key value with respect to the IP packet having the destination IP address [C] and [11] as a calculation key value with respect to the IP packet having the destination IP address [D] as a result of the calculation.

The label attaching module 32 assembles the MPLS frame (see FIG. 12(b)) by attaching the 2-stacked Shim headers as the MPLS headers to the IP packet. The calculation key storing module 33 forwards, to each of the label switched paths LSPs, the MPLS frame in which the calculation key value is embedded into the high-order 2-bit location (shown in FIG. 12(d)) in the field, stored with the VPN identifying label within the second Shim header, of the MPLS frame assembled by the label attaching module 32.

In the egress edge node 4 receiving these MPLS frames via the label switched paths LSPs, at first the label switching module 40 acquires [label removal] and [logical interface #0] as respective pieces of information about the output label and the output interface from the label table 101 (see FIG. 10).

Next, the calculation key extracting module 41 extracts the calculation key values [10], [11] from the high-order 2-bit locations of the fields, each stored with the VPN identifying label, of the MPLS frames corresponding to the respective IP packets.

After extracting the calculation keys, the link allocating module 42 searches, based on the respective calculation key values, the table 111 that maps the calculation key value to the physical interface for every logical interface, thereby determining the physical interfaces #0-2, #0-3 as output destinations.

The label removing module 43 removes the MPLS headers from the MPLS frames and forwards them as the IP packets to the thus determined physical interfaces #0-2, #0-3. As a result, these IP packets flow across the physical links #0-2, #0-3 among the plurality of physical links bundled by trunking as one single logical link.

The discussion in the first specific example given above has been made based on the premise that one or more switching nodes are located in relay positions between the ingress edge node 3 and the egress edge node 4, however, an architecture may be adopted wherein even one single switching node is not located in the relay position. In this case, the ingress edge node 3 forwards the MPLS frame formatted as shown not in FIG. 12(*d*) but in FIG. 12(*e*).

Namely, the ingress edge node 3 forwards the MPLS frame in a way that attaches only the Shim header containing the VPN identifying label without attaching the first Shim header containing the IP packet switching label on the basis of the normal MPLS switching process in the architecture including none of the switching nodes in the relay positions.

In the MPLS network system 1 adopting the architecture and operations described above, the egress edge node 4 receiving the frame attached with the MPLS header is capable of forwarding three pieces of forwarding target frames (IP packets) each having different source/destination IP addresses in a way that allocates these frames to the plurality of physical links aggregated by trunking with reference to only the MPLS headers. Besides, the frames having the same source/destination IP addresses are all allocated to the same physical link, and therefore a load sharing effect when allocating the frames can be enhanced without causing a reverse of sequence.

The first specific example of the MPLS network system has been exemplified such that the key value for determining the physical link to which the MPLS frame (packet) is allocated, is embedded into the label field, within the second Shim header, of the MPLS frame. A modified example thereof is that the key value may be embedded into other field within the same header.

Further, the description of the first specific example has been made based on the premise that the physical links existing between the ingress edge node 3 and the egress edge node 4 in the MPLS network 2 are not bundled by trunking, however, these physical links may be bundled by trunking. In this case, for instance, the ingress edge node 3 may determine the frame allocating target physical link on the basis of the key value obtained by the calculation key generating module 30, and the switching (core) node (CN) is capable of determining the frame allocating target physical link on the basis of the key value extracted from the MPLS header absolutely in the same way as the egress edge node 4 does (see FIG. 22).

In the first specific example, each of the 2-bit key values such as [00], [01], [10], [11] is mapped to one physical link, however, for example, the key values [00], [01] are mapped to the only physical link #0-0, and the key values [10,], [11] are mapped to the one physical link #0-1, whereby the respective key values can be mapped to an arbitrary but smaller number of physical links than the number expressed by the key values.

According to the first specific example, the egress edge node 4 always operates the calculation key extracting module 41 and the link allocating module 42. The egress edge node 4 may, however, operate the calculation key extracting module 41 and the link allocating module 42 in only such a case that the label table 101 has, for instance, a flag for indicating that the output interface is defined as the logical interface obtained as a result of trunking or the physical interface, and this flag indicates that [the output destination=the logical interface].

Further, the first specific example has shown the case where IP is tiered as a higher-order protocol on VPN configured based on MPLS. The protocol tiered on VPN may be, excluding IP, a network layer protocol such as IPX (Internetwork Packet Exchange) and so on.

[Second specific Example of MPLS Network System]

Next, a second specific example of the MPLS network system will be explained with reference to FIGS. 7 through 15 in combination.

The first specific example given above has exemplified the scheme that the calculation key is embedded into the label field within the MPLS header (the second Shim header) containing the VPN identifying label. What is herein exemplified as a modified example thereof is, however, a scheme that the calculation key is embedded into the MPLS header (the first Shim header) containing the IP packet switching label used within the MPLS network 2.

To begin with, before explaining an operation of the second specific example, an application target system will be described. According to a normal operation of MPLS, as in the conventional MPLS network system show in FIG. 1, the switching node just before the egress edge node in the MPLS network removes the MPLS header containing the IP packet switching label used within the MPLS network, and therefore this approach is not utilized in the egress edge node in the MPLS network.

Figure 13:
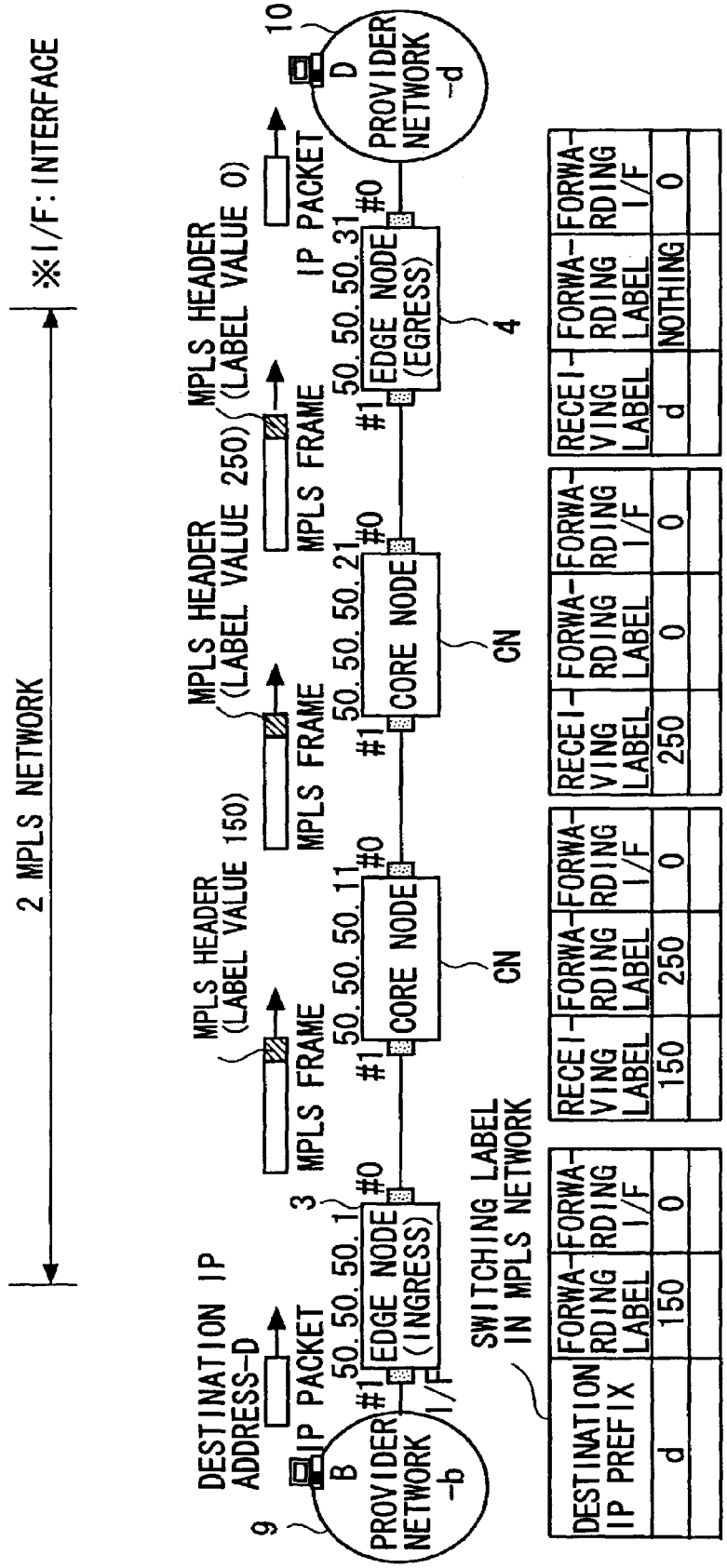
FIG. 13 is an explanatory diagram showing an example of label switching of an MPLS header containing an IP packet switching in the system in one embodiment of the present invention.
Figure 14:
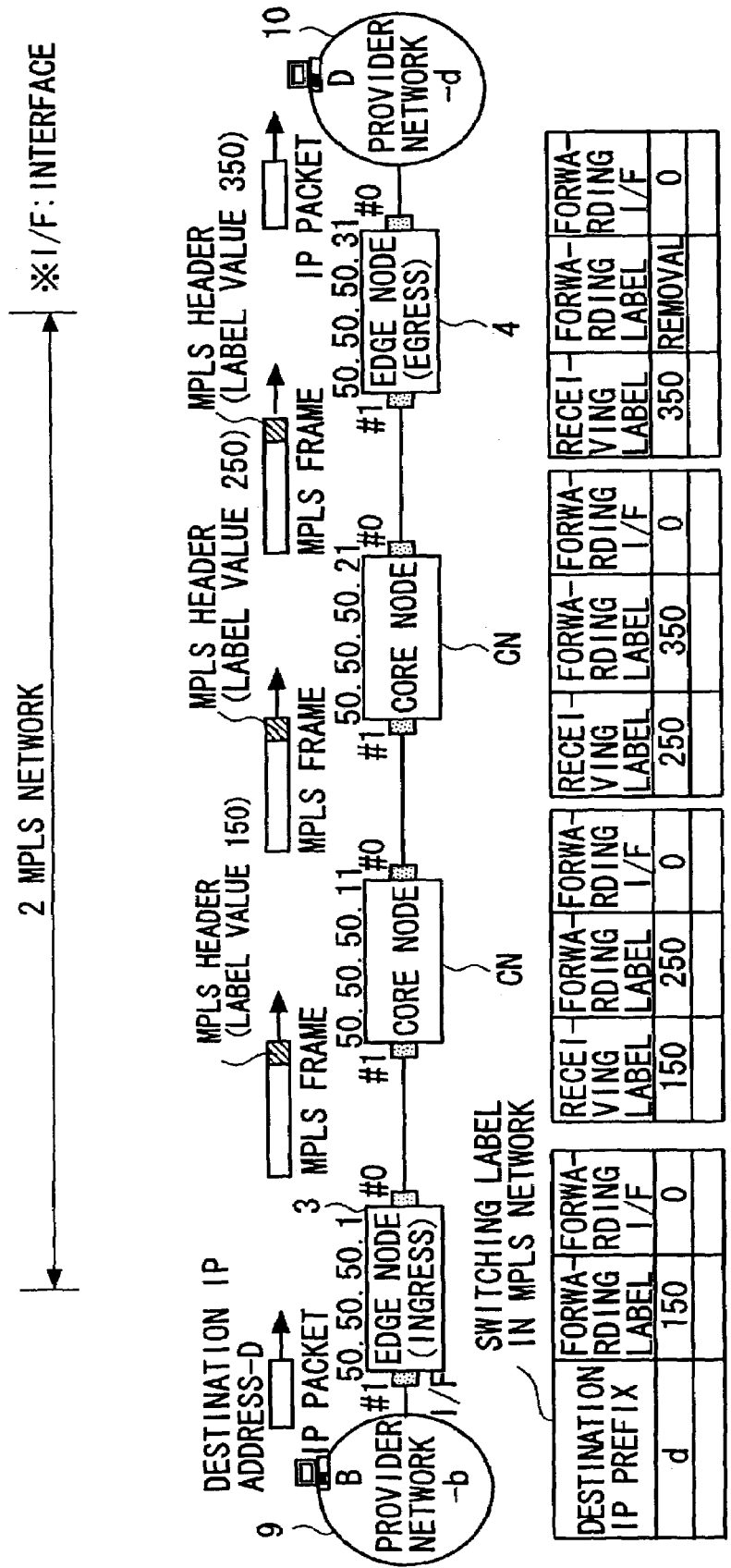
FIG. 14 is an explanatory diagram showing an example of label switching of the MPLS header containing the IP packet switching in the system in one embodiment of the present invention.
Figure 15:
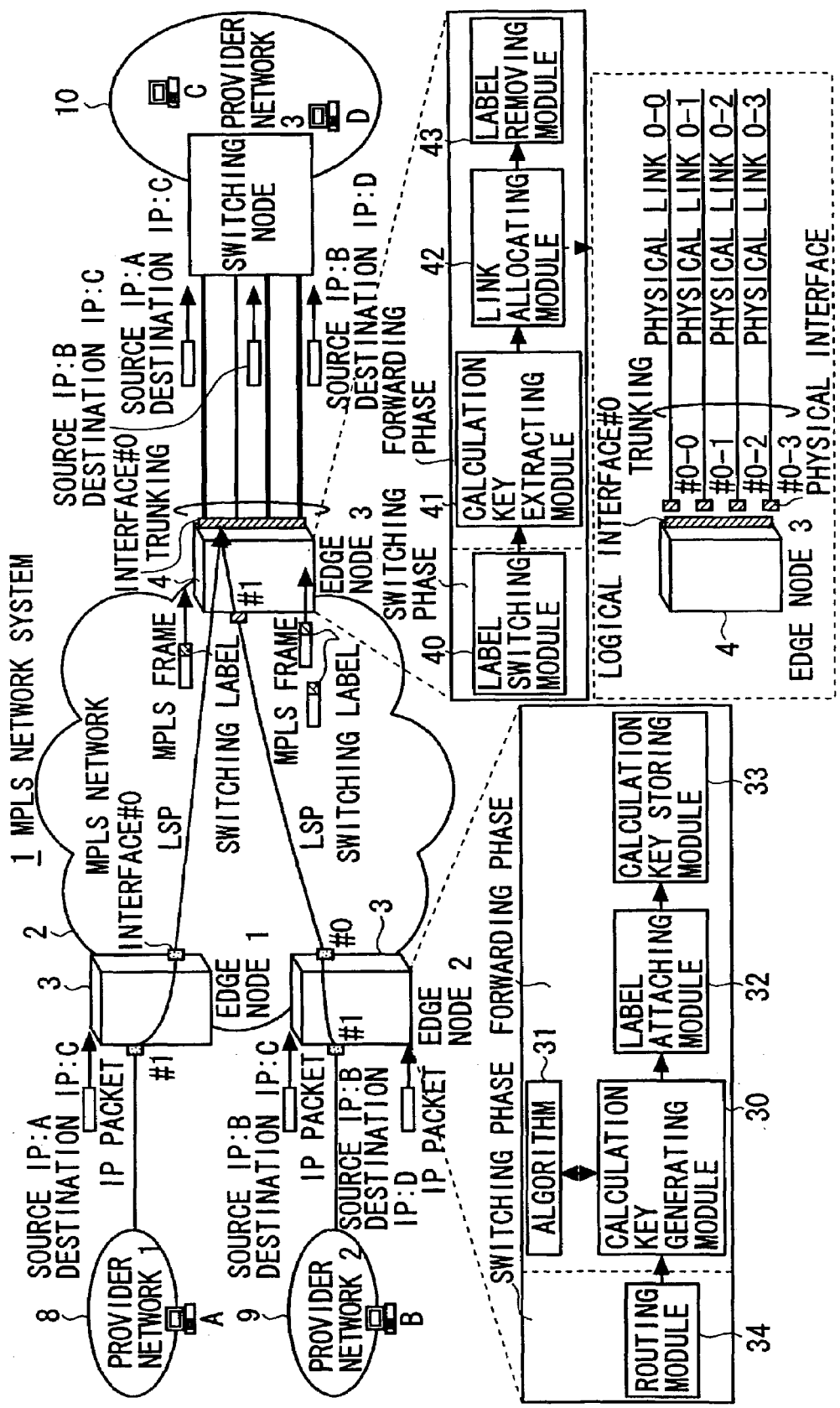
FIG. 15 is a bock diagram showing a second specific example of the MPLS system in one embodiment of the present invention.

The MPLS operation may, however, take other mode in which the MPLS frame is routed down to the egress edge node in the MPLS network without removing the MPLS header containing the IP packet switching label used within the MPLS network. FIGS. 13 and 14 show an example of this architecture of the MPLS network system.

Figure 1:
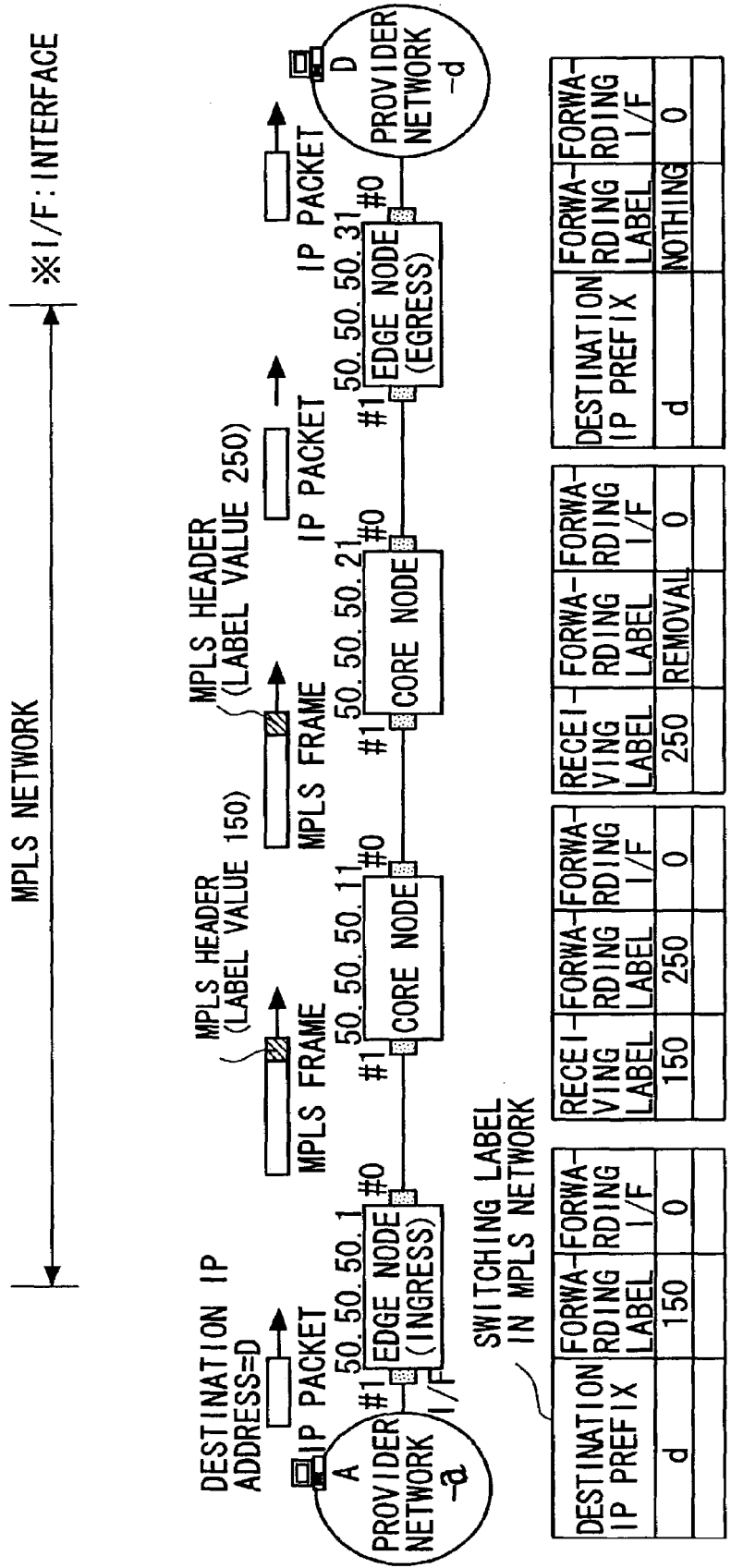
FIG. 1 is an explanatory diagram showing how an IP packet is routed in a conventional MPLS network system.

FIG. 13 shows an architecture in which MPLS is operated on, e.g., an ATM (Asynchronous Transfer Mode) network. Namely, the switching node CN just before the egress edge node 4, instead of removing the MPLS header as shown in FIG. 1, forwards the MPLS frame in a way that stores the MPLS header with a label for indicating a next hop node to effect a label Pop [removable] and Ipv4-header-based routing. This label is defined in IETF (Internet Engineering Task Force) Standard RFC-3032 as an Ipv4 Explicit Null Label, and takes a value of [0]. When the MPLS frame flows across the label switched path, the egress edge node 4 receives the MPLS frame having the label value [0].

FIG. 14 illustrates, though not general in terms of an extension mode of the label switched path, a mode of routing the MPLS frame attached with a normal label (which is not the Explicit Null Label) across the label switched path down to the egress edge node 4. Namely, the switching node CN just before the egress edge node 4, instead of removing the MPLS header as shown in FIG. 1, forwards the MPLS frame containing, e.g., a label value [350], and the egress edge node 4 receives this MPLS frame attached with the MPLS header.

Figure 12:
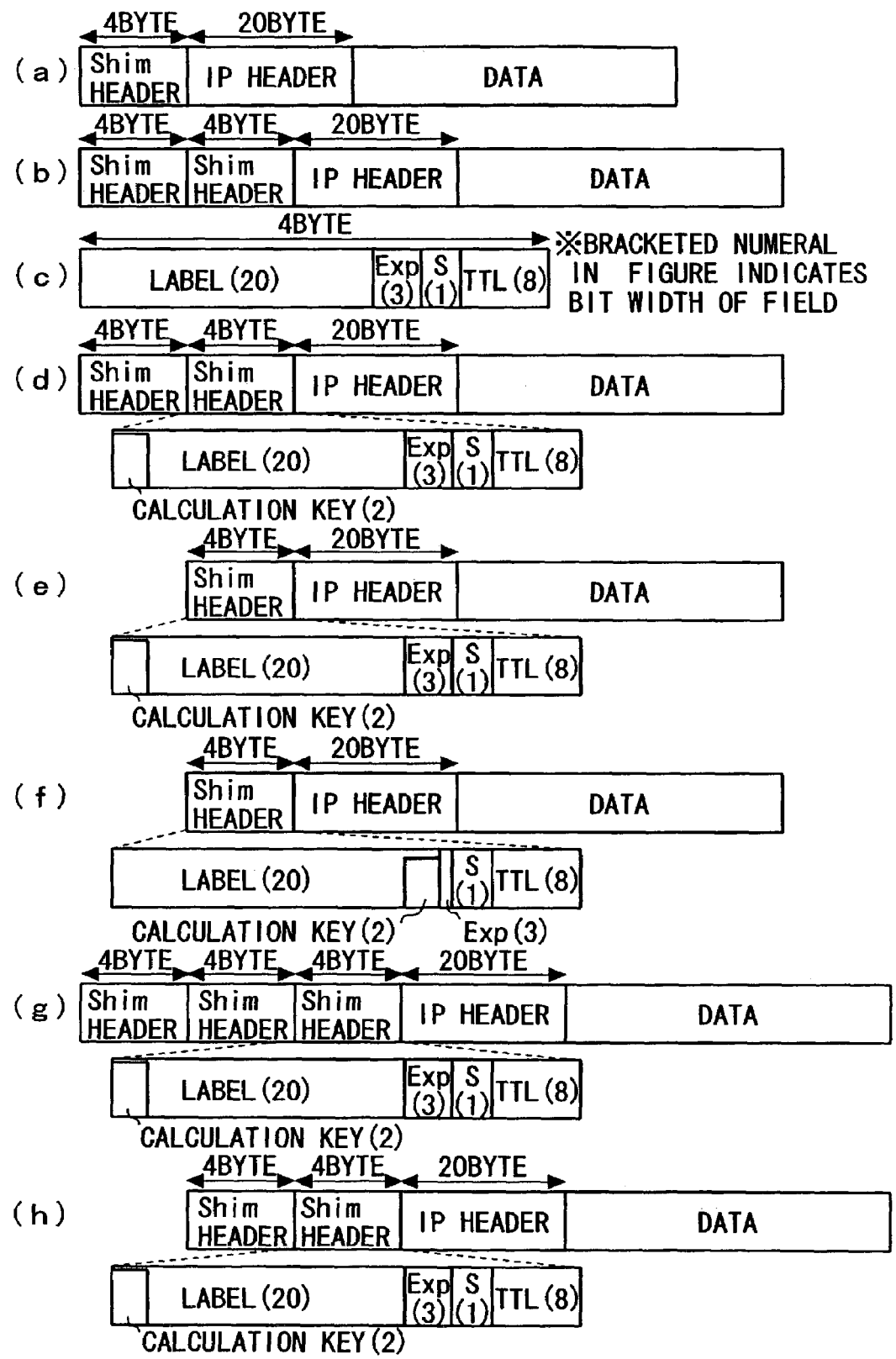
FIG. 12 is a diagram showing a variety of frames and header formats in the system in one embodiment of the present invention.

In the MPLS network system in the second specific example shown in FIG. 12, the application target may include a case where this type of MPLS frame containing the IP packet switching label used within the MPLS network 2, flows down to the egress edge node 4.

It is assumed in this MPLS network system 1 that the label switched path LSP for routing as shown in FIG. 14 be extended from the ingress edge node (#1) 3 and the ingress edge node (#2) 3 down to the egress edge node 4.

Further, none of VPNs is built in the MPLS network 2 of this system 1. Namely, the operation will be explained based on the premise that the MPLS header containing the switching label is added with no stack to the IP packet and routed as the MPLS frame. Note that various categories of tables included in the respective nodes are the same as those shown in the first specific example.

To start with, an assumption is that the ingress edge node (#1) 3 located in the ingress position of the MPLS network 2, receives the IP packet containing the source IP address [A] and the destination IP address [C], which has been forwarded from the terminal device A accommodated in the provider network (#1) 8 defined as a user site.

In this specific example, the network is not VPN, and hence the routing module 34 in the ingress edge node (#1) 3 does not judge VPN on the basis of the receiving interface, and acquires, from the IP packet switching routing table 91 (see FIG. 9) used within the MPLS network 2, an IP packet switching label used in the MPLS network 2 and an output interface for forwarding to the destination IP address [C] contained in the IP packet.

Next, the calculation key generating module 30, based on the algorithm 31 as in the first specific example, delimits the whole bits of the source/destination IP addresses each having 32 bits) contained in the IP packet header by 2 bits, and takes an exclusive OR thereof, thereby obtaining the calculation key values.

The label attaching module 32 attaches one MPLS header (Shim header) containing the IP packet switching label to this IP packet. FIG. 12(a) shows an example of the format of the MPLS frame after being attached with the MPLS header.

In the MPLS frame attached with the MPLS header, the calculation key storing module 33 further embeds the calculation key (2 bits in this example) into the specified field in the MPLS header. An embedding location is to be not a field in the second MPLS header but a specified field in the first Shim header.

Herein, the calculation key is embedded into, for instance, a high-order 2-bit location as an embedding location in a 3-bit Exp field. FIG. 12(f) shows an MPLS frame format after embedding the calculation key. Note that 2 bits of the 3-bit Exp field are used for embedding the calculation key, and hence a value used for "Exp" needs to be a value equal to or smaller than 1 bit.

With the process executed above, the MPLS frame assembled in the ingress edge node (#1) is thereafter, as shown in, e.g., FIG. 14, routed to the egress edge node 4 by the respective switching nodes CN located in the internal positions of the MPLS network 2 on the basis of the MPLS frame switching process. Then, the egress edge node 4 receiving the MPLS frame allocates, absolutely in the same way as the first specific example has shown, the MPLS frame as an IP packet to any one of the plurality of physical links bundled by trunking.

Note that the same processing is applied to a case where the ingress edge node (#2) 3 located in the ingress position of the MPLS network 2 receives two pieces of IP packets sent from the terminal device B accommodated in the provider network (#2) 9 defined as a user site, and the thus processed MPLS frames (the two IP packets) are routed via the switching nodes t the provider network (#3) 10.

The second specific example given above has exemplified the scheme that the calculation key is embedded into the Exp field within the MPLS header (the first Shim header), however, the calculation key may be, as a substitute scheme, embedded into a TTL (Time-To-Live) field within the MPLS header. Herein, the MPLS frame is routed in such a way that each of the switching nodes CN in the MPLS network 2 rewrites the first Shim header by label swapping and TTL decrement.

Normally, unlike the Exp field that can not be rewritten in the switching node CN in the MPLS network 2, the TTL field is normally decremented (rewritten) by one by one in the switching node, and the calculation key value might be rewritten, however, it does not normally happen that there are as many switching nodes as several tens via which one single MPLS frame is routed.

Accordingly, in the ingress edge node 3 in the MPLS network 2, if the calculation key is embedded into the high-order 2 bits of, for example, an 8-bit TTL field and if [63]0 is stored in a remaining 6-bit TTL field, the calculation key value is not rewritten till the MPLS frame is routed down to the egress edge node 4, and therefore there is no problem in practicality even when being embedded into the TTL field.

Further, the second specific example has explained the scheme that none of VPNs is configured on the MPLS network 2, and the forwarding target MPLS frame is attached with the MPLS header with no stack and thus routed within this MPLS network 2. If VPN is built, however, the first MPLS header (the first Shim header) is applicable as a storage field. In this case, the VPN identifying label is stored in the second MPLS header (the second Shim header).

[Third Specific Example of MPLS network System]

Figure 16:
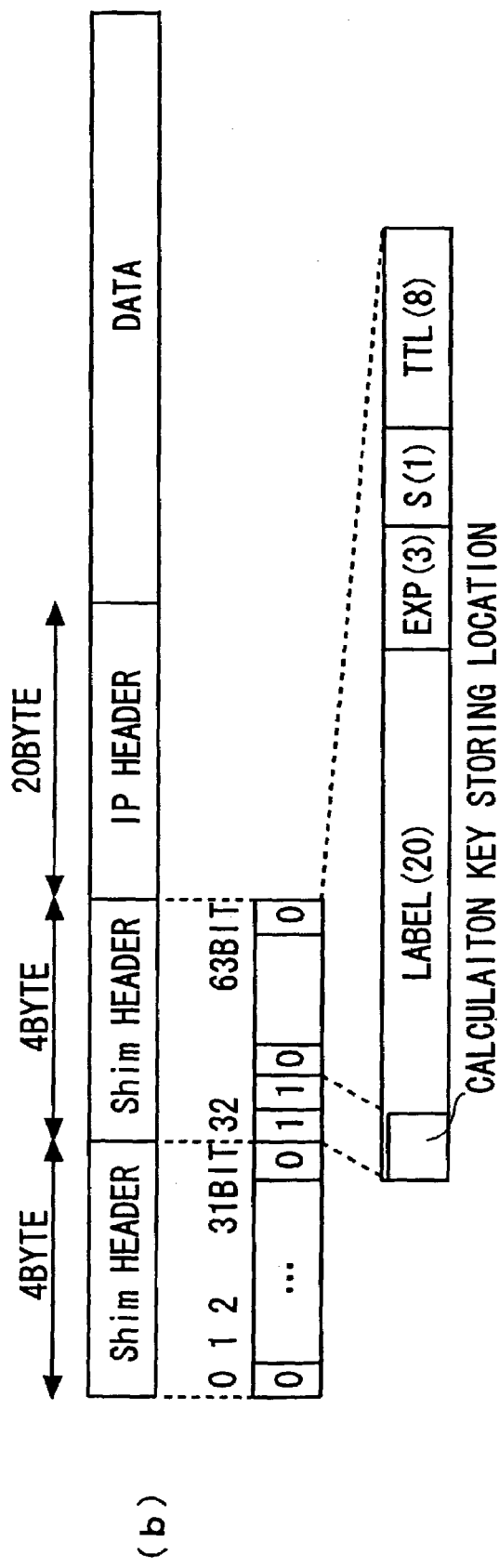
FIG. 16 is a bock diagram showing a third specific example of the MPLS system in one embodiment of the present invention.
Figure 17:
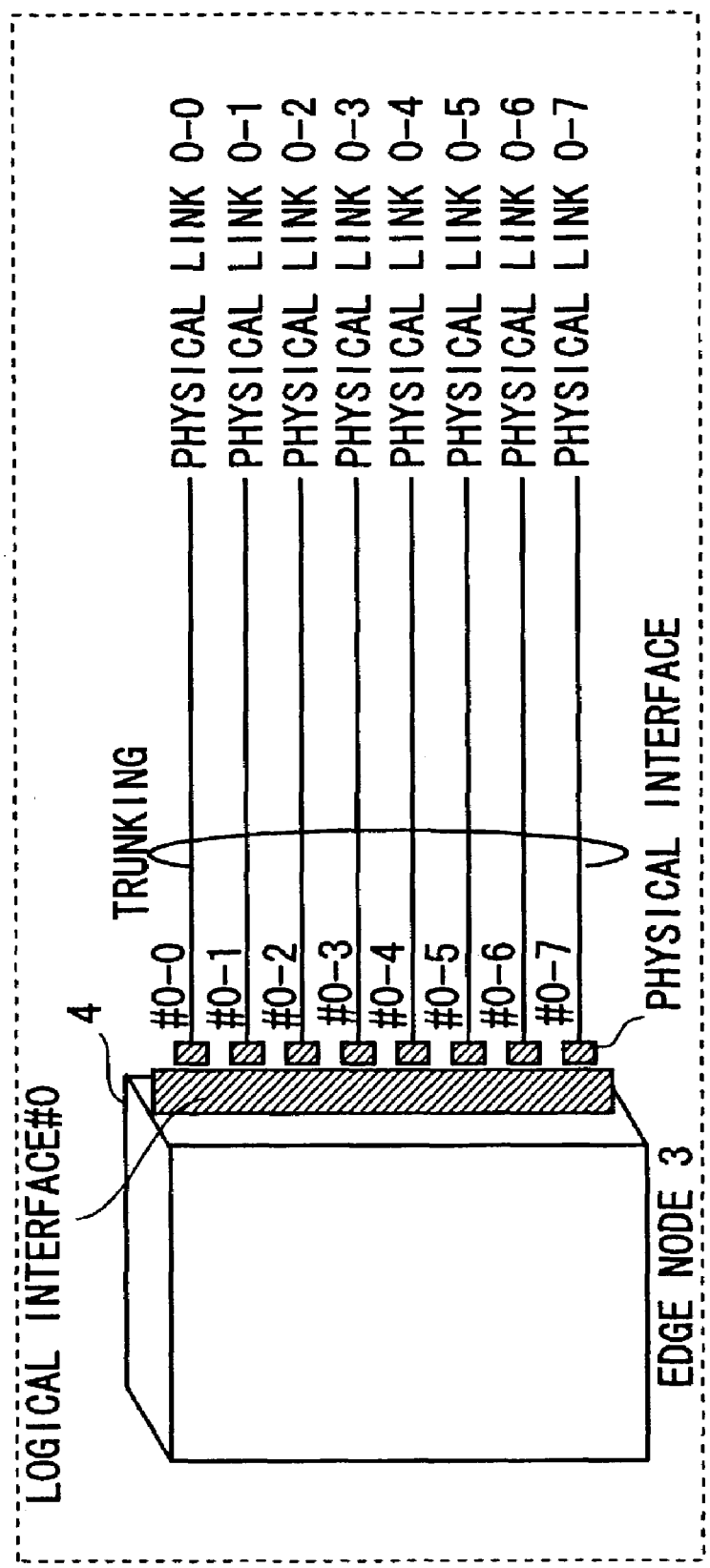
FIG. 17 is a bock diagram showing a fourth specific example of the MPLS system in one embodiment of the present invention.
Figure 19:
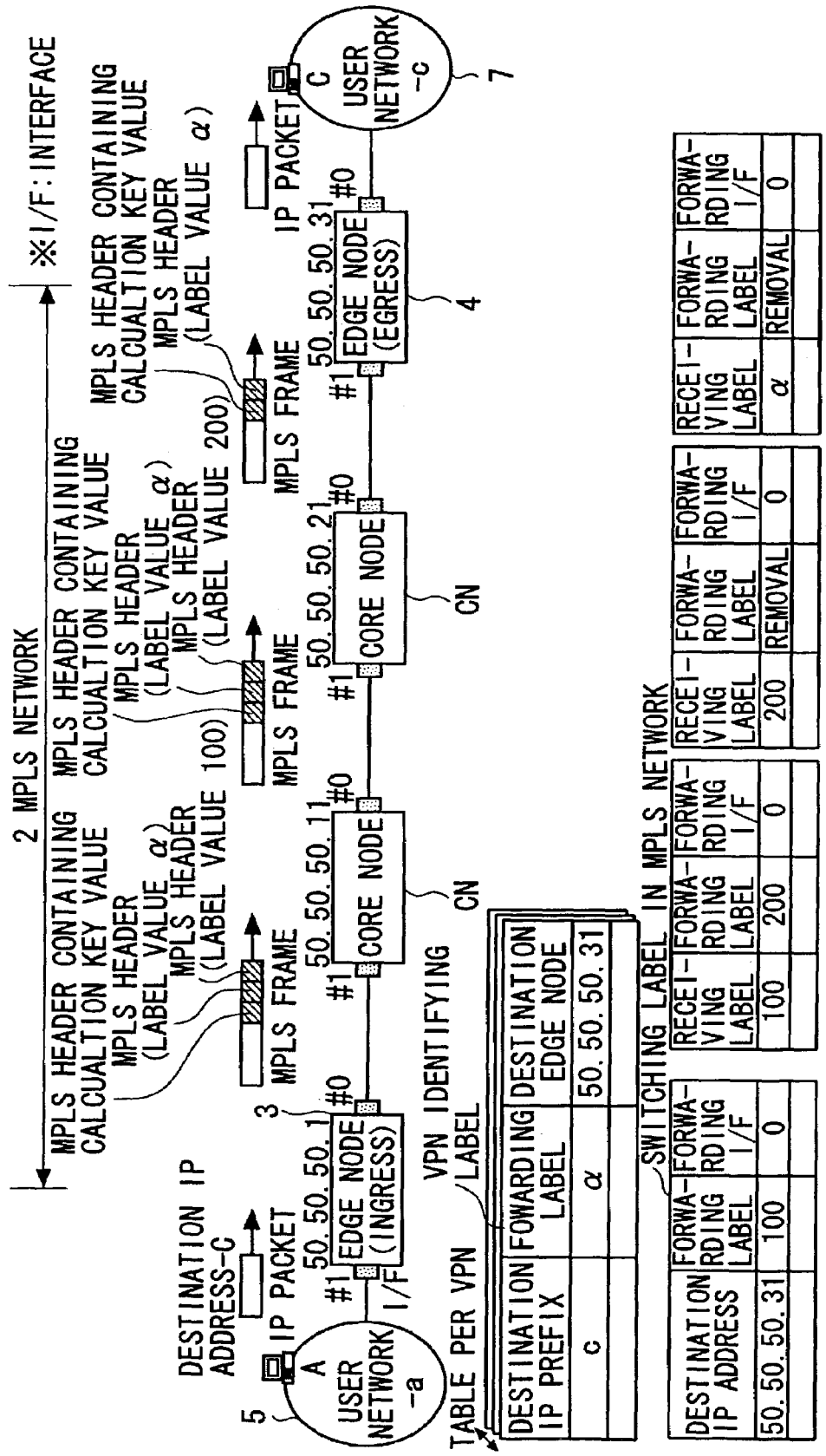
FIG. 19 is a bock diagram showing a fifth specific example of the MPLS system in one embodiment of the present invention.

Next, a third specific example of the MPLS network system 1 will be explained with reference to FIGS. 6 and 16 in combination.

The discussion in the third specific example will be focused on a case in which the calculation key storing module 33 of the ingress edge node 3 gives a notification of a key value embedding location to each of the nodes provided on the label switched path LSP extending from the ingress edge node 3.

Given herein is an explanation of a case in which the location stored with the calculation key by the calculation key storing module 33 is a high-order 2-bit location in the label field within the second Shim header containing the VPN identifying label used within the MPLS network 2.

To begin with, when building the label switched path LSP, the field notifying module (unillustrated) of the egress edge node 4 notifies all the nodes existing on the label switched path LSP of an embedding target location embedded with the calculation key by the calculation key storing module 33. Therefore, a specific method is that there is extended LDP (Label Distribution Protocol) defined as a label distribution protocol used when building the label switched path LSP, and, as shown in FIG. 16(a), a mask value indicating an embedding location in a field corresponding to two pieces of MPLS headers (64 bits), is stored in an LDP message.

Namely, when building the label switched path LSP over the MPLS network 2, the egress edge node 4 inserts (stores) a message in FIG. 16(a) to an LDP message and thus forwards an LDP-based frame to the MPLS network 2.

The switching node or the ingress edge node 3 receiving this LDP-based frame in the MPLS network 2 extracts the LDP message in FIG. 16(a) from this frame, and stores a key value in the MPLS header or stores it as a mask value for extracting the key value from the MPLS header.

Thereafter, each module including the calculation key storing module 33 is capable of determining a location of the key value stored in the MPLS header or determining it based on the mask value.

In this example, the mask value of the location corresponding to the high-order 2 bits of the second MPLS header (the second Shim header) is [1], and it is therefore possible to recognize that the high-order 2 bits of the label field in the second MPLS header correspond to the calculation key embedding location (FIG. 16(b)).

If the label switched path LSP is, as shown in FIG. 13 or 14, extended so that the MPLS frame with its MPLS header remaining unremoved is routed across the MPLS network 2 down to the egress edge node 4, the switching node and the egress edge node 4 in the MPLS network 2 may, as shown in FIG. 16(b), recognize the key value embedding location.

Figure 2:
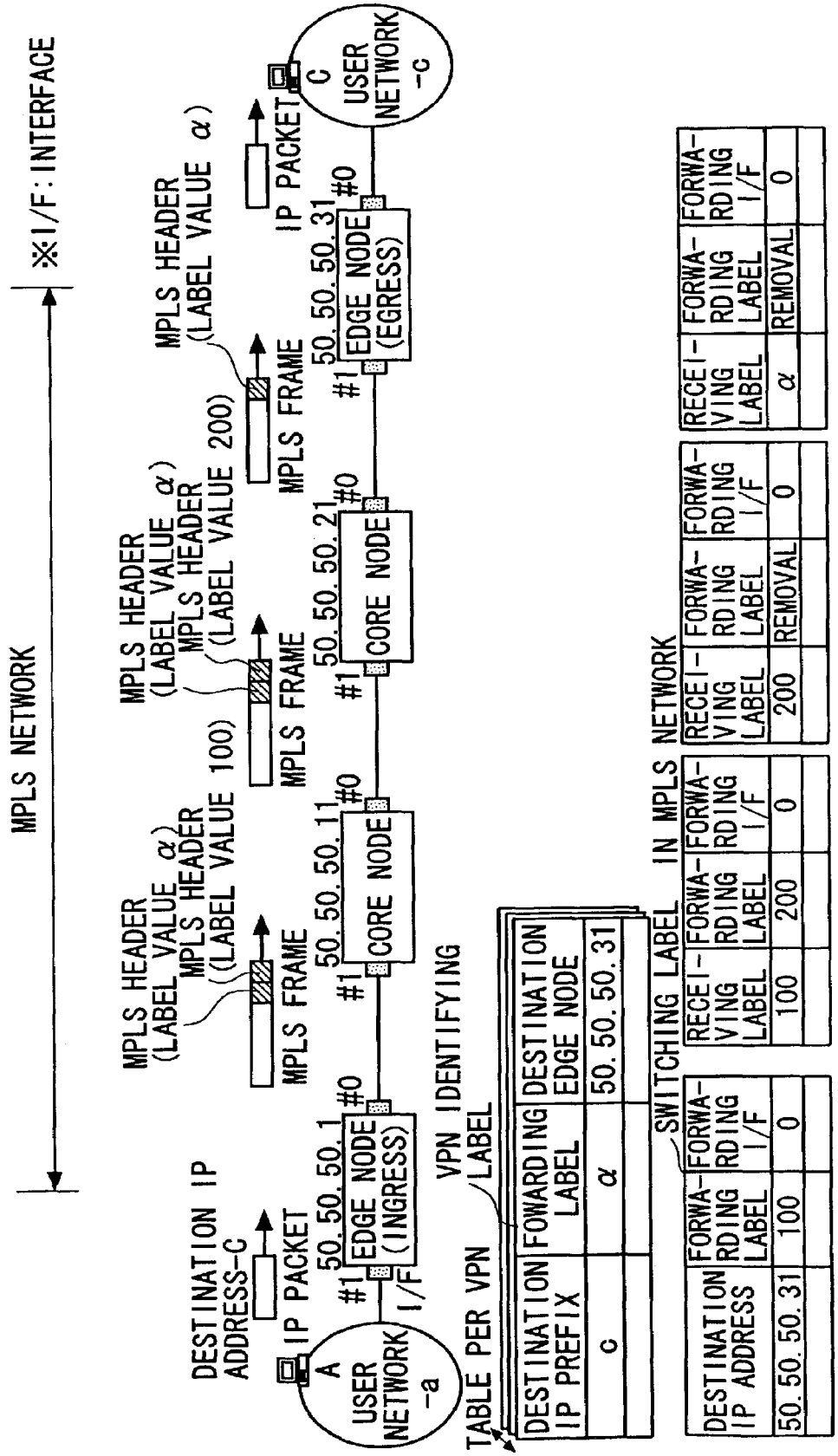
FIG. 2 is an explanatory diagram showing VPN in the conventional MPLS network system.
Figure 3:
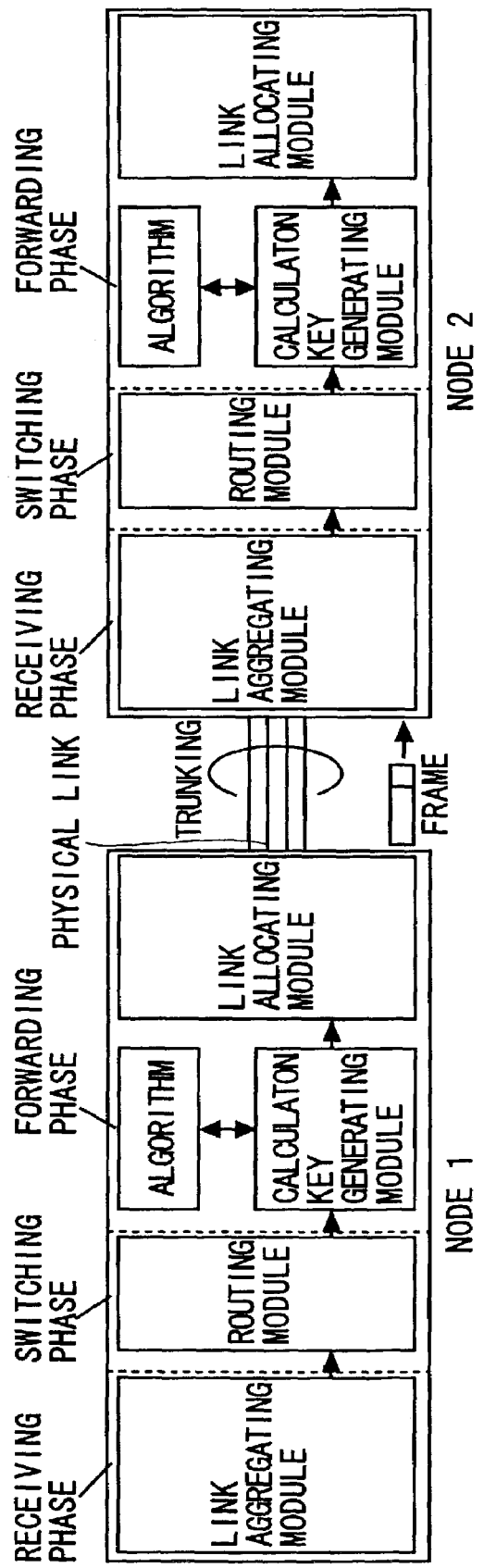
FIG. 3 is an explanatory diagram showing a trunking technique in the conventional MPLS network system.
Figure 4:
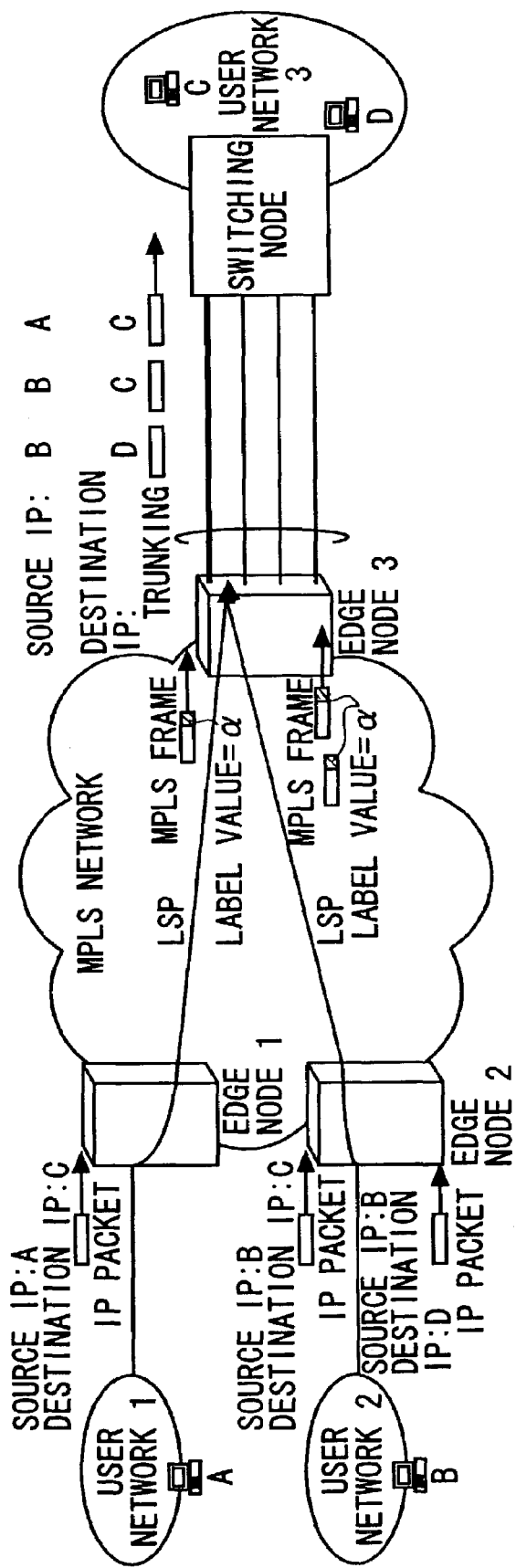
FIG. 4 is an explanatory view illustrating a problem about determining a allocating destination link in the conventional MPLS network system.

If the label switched path LSP is, as shown in FIG. 1 or 2, extended so that the MPLS frame with its MPLS header removed by one stack in the switching node just anterior to the egress edge node in the MPLS network 2, however, the switching node in the MPLS network 2 recognizes the embedding location as shown in FIG. 16(b), while the egress edge node 4 ignores a mask value falling within 0 through 31 bits of the mask but recognizes a mask value falling within 32 through 63bits as what belongs to the first MPLS header.

With the processing in the third specific example, it is feasible to dynamically set the calculation key embedding position that has been statically set in the whole system according to the first and second specific examples.

[Fourth Specific Example of the MPLS Network System]

Next, a fourth specific example of the MPLS network system 1 will be described referring to FIGS. 6 through 10, 12, 17 and 18 in combination.

The discussion in the fourth specific example will deal with a case where in the egress edge node 4 within the MPLS network 2 using the MPLS protocol in the MPLS network system 1, the number of the plurality of physical links bundled by trunking as they appear to be one logical link is larger than the number of links that can be expressed by a key length of the key embedded by the calculation key storing module 33.

The system as a premise of the discussion has basically the architecture shown in FIG. 6 that is referred to when explaining the first specific example, however, the number of the physical links bundled by trunking is 8 (see FIG. 17) unlike the system illustrated in FIG. 6.

In this case, if the embedded key has a 2-bit length, an expression of eight physical links #0-0 through #0-7 is beyond the 2-bit basis expression described above, which is a different point from the first specific example. Further, the egress edge node 4 is provided with a link allocating module 42 for allocating the packets to the eight physical links.

The VPN architecture, the label switched path LSP for connecting the user network (#1) 5 with the user network (#3) 7, the label attached on the label switched path LSP for connecting the user network (#2) 6 with the user network (#3) 7 and the tables held by the respective modules, are the same as those in the first specific example. The table 111 shown in FIG. 11 is, however substituted for a table 181 shown in FIG. 12.

Given herein is an explanation of operations in which each of the ingress edge node (#1) 3 and the ingress edge node (#2) 3 located in the ingress positions in the MPLS network 2 attaches the MPLS header to the IP packet and forwards the thus assembled MPLS frame, and the egress edge node 4 receiving the MPLS frame via the label switched path LSP allocates the packet (frame) to one of the eight physical links bundled by trunking in a way that by refers to only the MPLS header.

To begin with, each of the ingress edge node (#1) 3 and the ingress edge node (#2) 3 attaches, absolutely in the same way as the first specific example shows, the MPLS header to the IP packet received outside the MPLS network 2 and forwards the thus assembled MPLS frame to the egress edge node 4.

In this case, a calculation key value about the IP packet received by the ingress edge node (#1) 3 from the user network 5 is [00], a calculation key value about the IP packet having a destination IP address [C] that is received by the ingress edge node (#2) 3 from the user network (#2) 6 is [10], and the calculation key value about the packet having a destination IP address [D] is [11].

In the egress edge node 4 receiving three pieces of MPLS frames forwarded from the ingress edge nodes (#1) 3 and (#2) 3, at first, the label switching module 40 acquires pieces of information about output labels and output interfaces from the label table 101 (see FOG. 10). In this case, these pieces of information are [label removal] and [logical interface #0] with respect to each of these three MPLS frames.

Next, the calculation key extracting module 41 extracts, with respect to these MPLS frames, [00], [10] and [11] as calculation key values from high-order 2-bit locations of the fields stored with the VPN identifying labels.

After extracting the calculation keys, the link allocating module 42, when determining the allocation destination physical interfaces among the eight physical interfaces #0-0 through #0-7 corresponding to the output logical interface #0, performs a calculation based on the algorithm 31 by inputting information in specified fields in the MPLS headers as well as the calculation keys, thereby outputting 3-bit key values.

Herein, the algorithm 31 exemplified herein involves delimiting a 20-bit label value by 1 bit and connecting a 1-bit value obtained by taking an exclusive OR thereof to a 2-bit calculation key value extracted by the calculation key extracting module 41. If an arithmetic result of taking the exclusive OR becomes [0], 3-bit calculation key values of [000], [010], [011] are respectively obtained as a result of the bit-connection.

The link allocating module 42 includes the table 181 (see FIG. 18) that maps the 3-bit calculation key value to the physical interface number for every logical interface, and therefore determines the physical interfaces [#0-0], [#0-2] and [#0-3] respectively as output destination interfaces as a consequence of searching this table 181 on the basis of the calculation key values [000], [010], [011].

The label removing module 43 removes the second Shim header as the MPLS header, and forwards the IP packets to the individual physical interfaces obtained by the link allocating module 42. As a result, the IP packets are forwarded to the physical links #0-0, #0-2, and #0-3.

[Fifth Specific Example of MPLS Network System]

Next, a fifth specific example of the MPLS network system 1 will be described referring to FIGS. 6 through 12, and 19 in combination.

The discussion in the fifth specific example will deal with a case where in the MPLS network 2, the scheme is not that the ingress edge node (#1) 3 stores the calculation key value in the MPLS header to which the MPLS packet switching label or the VPN identifying label belongs, but that the ingress edge node (#1) 3 inserts a new MPLS header (a third Shim header) to the IP packet and stores the calculation key value in this header.

The system as a premise of the discussion has basically the architecture shown in FIG. 6 that is referred to when explaining the first specific example. Further, the VPN architecture, the label switched path LSP for connecting the user network (#1) 5 with the user network (#3) 7, the label attached on the label switched path LSP for connecting the user network (#2) 6 with the user network (#3) 7 and the tables held by the respective modules, are the same as those in the first specific example.

Given herein is an explanation of operations in which the ingress edge node (#1) 3 located in the ingress position in the MPLS network 2 attaches the MPLS header to the IP packet and forwards the thus assembled MPLS frame, and the egress edge node 4 receiving the MPLS frame via the label switched path LSP allocates the packet (frame) to one of the plurality of physical links bundled by trunking in a way that by refers to only the MPLS header.

To begin with, when the ingress edge node (#1) 3 receives the IP packet from the user network (#1) 5, the routing module 34 judges VPN corresponding to the receiving interface on the basis of the VPN identifying table 71 (see FIG. 7).

Next, the routing module 34 obtains a VPN identifying label and an IP address of the destination edge node each mapping to the destination IP address [C] contained in the IP packet from the routing table 81 (see FIG. 8) per VPN.

Further, the routing module 34 acquires the IP packet switching label used within the MPLS network 2 and the output interface for forwarding to the obtained IP address of the destination edge node from the IP packet switching routing table 91 (see FIG. 9) used within the MPLS network 2.

Next, the calculation key generating module 30 extracts the source IP address [A] and the destination IP address [C] contained in the IP packet header, and calculates, based on the algorithm 31, the calculation key for determining an allocation destination link. The label attaching module 32 attaches two pieces of MPLS headers (Shim headers) to this IP packet. FIG. 12(b) shows a frame format after being attached with the two MPLS headers.

With respect to the MPLS frame attached with the MPLS header, the calculation key storing module 33 inserts a third MPLS header posterior to the second MPLS header that contains the VPN identifying label, to the MPLS frame formatted as shown in FIG. 12(b) that is outputted by the label attaching module 32. This third MPLS header is defined as a header exclusively used for storing the calculation key.

The calculation key storing module 33 embeds the calculation key (2 bits in this example) into a specified field within the third MPLS header padded herein. A field location and a field length of the field as an embedding destination are arbitrarily selectable, however, the calculation key is embedded into the high-order 2-bit location as the embedding destination in the label field. FIG. 12(g) shows a format of the MPLS frame after embedding.

The MPLS frame assembled by the processes described above is, as illustrated in FIG. 19, routed to the egress edge node 4 by the label switching modules in the plurality of switching nodes CN located in the internal positions of the MPLS network 2 on the basis of the MPLS frame switching process. FIG. 12(h) shows a format of the MPLS frame received by the egress edge node 4.

Note that the MPLS frame is routed in a way that rewrites the first Shim header in the MPLS frame shown in FIG. 12(g) through label swapping and TTL decrement in the switching node in the MPLS network 2. Since the label field for embedding the calculation key value is provided within the third Shim header, it does not happen that this calculation key value is rewritten in the switching node CN in the MPLS network 2.

In the egress edge node 4 receiving the MPLS frame formatted as shown in FIG. 12(h), at first the label switching module 40 obtains pieces of information on the output label and the output interface from the label table 101 (see FIG. 10). In this case, the output label information and the output interface number become [label removal] and [logical interface #0].

The calculation key extracting module 41 extracts a calculation key value [00] from the high-order 2-bit location of the label field not within the second MPLS header stored with the VPN identifying label but within the third MPLS header posterior thereto, and thereafter sets this third MPLS header as a target to be removed.

The link allocating module 42 determines the physical interface #0-0 as an output destination mapping to the calculation key value [00] among the physical interfaces corresponding to the output logical interface #0.

The label removing module 43 sets as removal targets all the Shim headers (which are the second and third Shim headers in FIG. 12(g) in the MPLS frame shown in FIG. 12(h) that is received by the egress edge node 4. The IP packet having the source IP address [A] and the destination IP address [C] is forwarded to the physical interface #0-0 determined by the link allocating module 42, with the result that this IP packet flows across the physical link #0-0.

Note that a process, though not explained herein, of attaching the new MPLS header (the third Shim header) to the IP packet and storing the calculation key value in this header by the ingress edge node (#2) 3, is basically the same as the process in the ingress edge node (#1) 3.

[Sixth Specific Example of MPLS Network System]

Figure 20:
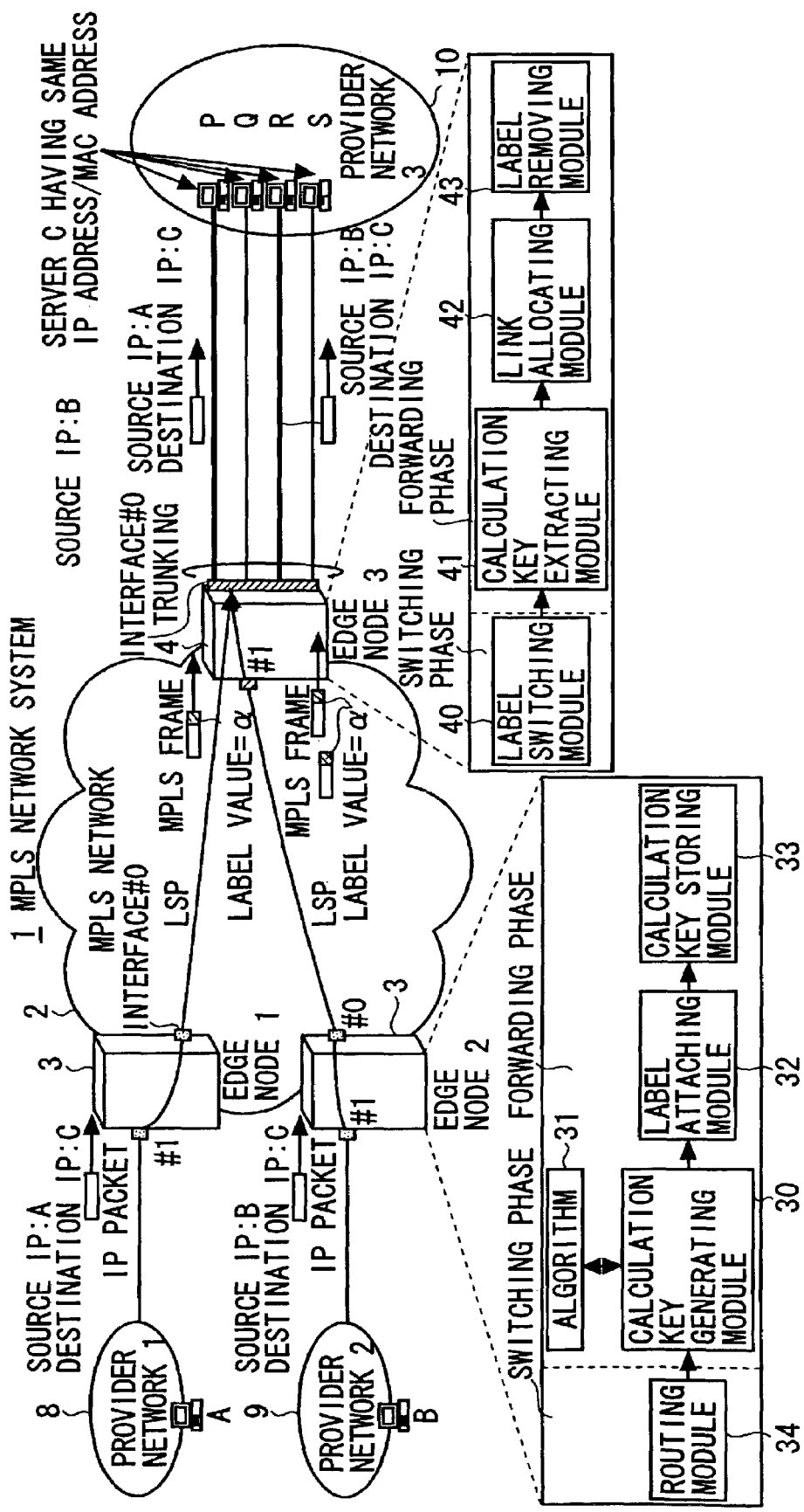
FIG. 20 is a bock diagram showing a sixth specific example of the MPLS system in one embodiment of the present invention.

Next, a sixth specific example of the MPLS network system 1 will be described referring to FIG. 20.

In the MPLS network system 1 according to the sixth specific example, the egress edge node 4 in the MPLS network 2, instead of connecting the plurality of bundled physical links to one single switching node in the provider network (#3) 10, connects servers (defined as a plurality of load sharing target servers C having the same IP address and MAC address) P, Q, R, S as a plurality of terminal devices to the respective links.

These servers P through S are categorized as Web servers respectively having IP address [P, Q, R, S] within network "Prefix" in the provider network 10 and retaining the same content data.

Supposing that the ingress edge nodes (#1) 3 and (#2) 3 behave the same as in the first specific example, the IP packets sent from the terminal devices A, B are transmitted in distribution to the two servers P and R.

The IP packets transmitted in distribution from the egress edge node 4, which belong to the same flow (session), are invariably allocated to the same server, and therefore the communications (packets) of the same flow are not allocated to different servers. This can be applied as a server load sharing scheme.

[Seventh Specific Example of MPLS Network System]

Next, a seventh specific example of the MPLS network system 1 will be explained referring to FIG. 21.

Figure 21:
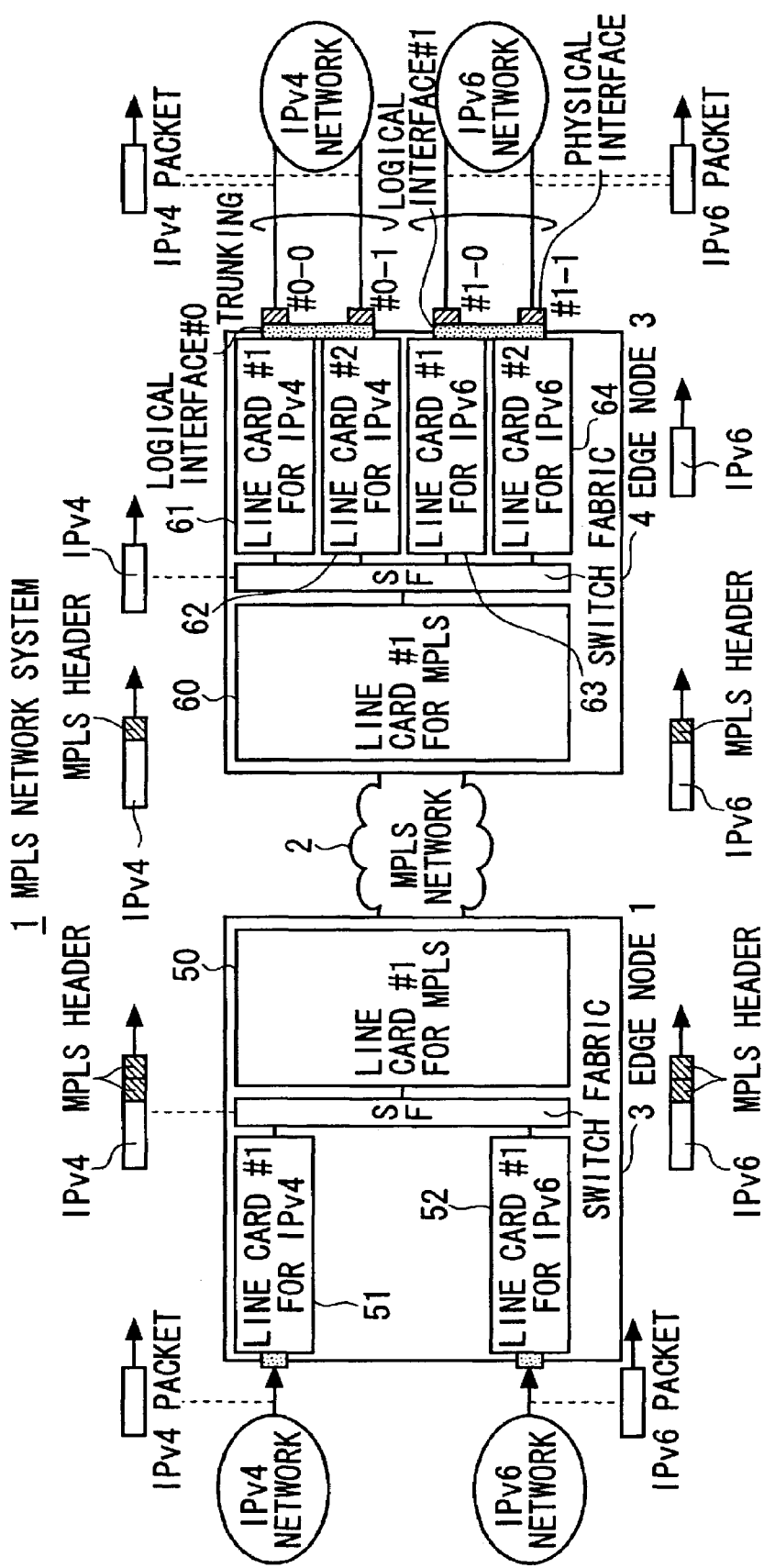
FIG. 21 is a bock diagram showing a seventh specific example of the MPLS system in one embodiment of the present invention.

The discussion on the MPLS network system 1 in each of the first through sixth specific examples given above, is that the egress edge node 4 in the MPLS network 2 allocates the packet to any one of the plurality of physical links bundled by the trunking technique in a way that refers to the MPLS header of the MPLS frame, however, this is particularly effective in a case where the ingress edge node 3 and the egress edge node 4 in the MPLS network 2 take structures shown in FIG. 21.

In the MPLS network system 1 according to this seventh specific example, an Ipv4-based line card 51 and an IP-v6-based line card 52 in the ingress edge node 3, and an MPLS-based line card 60 in the egress edge node 4 implement components (functions) exemplified in the respective specific examples given above.

In the ingress edge node 3, a plurality of line cards 50, 51, 52 are connected to each other via a switch fabric SF. Further, in the egress edge node 4, a plurality of line cards 60, 61, 62, 63, 64 are connected to each other via the switch fabric SF. Each of the MPLS-based line cards 50, 60 processes only the MPLS header attached frame (MPLS frame) as a hardware processing target, namely, processes it within the line card itself, and sets the frame (IP packet) with no MPLS header as a software processing target processed by software executed by an unillustrated CPU.

The Ipv4-base line cards 51, 61, 62 set only the Ipv4 frame with no MPLS header as a hardware processing target and set other frames as software processing targets. Further, the Ipv6-based line cards 52, 63, 64 set only the Ipv6 frame with no MPLS header as a hardware processing target and set other frames as software processing targets.

In the ingress edge node 3 and the egress edge node 4 adopting this structure, as will be explained next, a process of determining an output destination physical link in the MPLS-based line card is a process based on only the MPLS header, and the process based on the IPv4- and IPv6 headers becomes unnecessary. This scheme is convenient in terms of simplifying the hardware and enhancing a switching performance.

Herein, the processes in the ingress edge node 3 and the egress edge node 4 will be outlined. In the ingress edge node 3, at first, in the IPv4-based line card 51 receiving the IPv4 packet, the routing module 34 determines an output destination physical interface and line card, after the built-in label attaching module 32 has attached the MPLS header to the packet, the calculation key storing module 33 stores the calculation hey, and the MPLS header attached frame is forwarded to the MPLS-based line card 50. The MPLS-based line card 50 forwards the MPLS header attached frame intact across the MPLS network 2.

Next, in the egress edge node 4, when receiving the MPLS header attached frame, in the MPLS-based line card 60, after the built-in label switching module 40 has determined the output logical interface, the link allocating module 42 determines one pair of the output destination physical link and line card (e.g., the physical link #0-0 and the line card 61), and the label removing module 43 removes the MPLS header, thereby forwarding the IPv4 packet (with no MPLS header) to the line card 61.

In this MPLS network system 1 adopting the architecture shown in FIG. 21, especially in the egress edge node 4, the MPLS-based line card 60 is capable of determining the output destination physical link on the basis of only the MPLS header without referring to the IPv4 and IPv6 headers in the MPLS-based line card 60. This scheme is convenient for simplifying the hardware and enhancing the switching performance.

In the present MPLS network system 1, the packets are allocated to the plurality of physical links bundled by trunking in away that refers to only the MPLS headers, and hence the egress edge node 4 operates the MPLS-based line card 60 connected to the MPLS network 2 to execute the switching process by referring to only the MPLS headers, thereby making it possible to simplify and speed up the processing.

Further, a connection between the MPLS-based line card 60 and the IPv4-based line cars 61, 62 and a connection between this line card 60 and the IPv6-based line cards 63, 64 are established by a switch fabric SF. Therefore, when supposing such a case as to support trunking that covers both of the IPv4-based line cards 61, 62 or the IPv6-based line cards 63, 64, the MPLS-based line card 60 connected to the MPLDS network 2 is capable of enhancing the load sharing effect when in the allocating process without causing any reverse of sequence within a range of the process of referring to only the MPLS headers.

MODIFIED EXAMPLE

One embodiment discussed above has exemplified the case in which the calculation key generating module 30 in the ingress edge node 3 generates the calculation key on the basis of the source IP address and the destination IP address contained in the IP header corresponding to the third layer (network layer) of OSI (Open Systems Interconnections) Reference Model. The calculation targets may, however, be set to a protocol field value in the IP header, a protocol header on the fourth layer (transport layer) of OSI Reference Model, and also source identifying information and destination identifying information contained in the header unique to application such as HTTP (HyperText Transfer Protocol).

The respective processes in one embodiment discussed above are provided as a program executable by the computer, and the program may be recorded on a recording medium such as a CD-ROM, a flexible disk etc and may also be distributed via communication lines.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. An MPLS network system comprising:
a first edge node including:
a generation module generating a key value for determining an allocating destination link in a way that uses, as input values, a piece of source identifying information and a piece of destination identifying information contained in a header of a forwarding target frame before being attached with an MPLS header enabling the frame to be forwarded across within an MPLS network on the basis of an MPLS protocol;
an embedding module embedding the key value generated by said generation module into a specified field in the MPLS header; and
a transmitting module transmitting the MPLS frame containing the key value embedded into the specified field in its MPLS header to the MPLS network; and
a second edge node including:
an extraction module extracting the key value from the specified field in the MPLS header of the MPLS frame received via the MPLS network; and
a determining module determining one physical link as the allocating destination link among a plurality of physical links that are logically bundled beforehand as one link on the basis of the key value extracted by said extraction module.

2. An MPLS network system according to claim 1, wherein said generation module in said first edge node generates, as a key value for determining the allocating destination link, a pseudo random number obtained as a result of performing a calculation using a one-way function in a way that uses, as input values, the source identifying information and the destination identifying information contained in the header of the forwarding target frame.

3. An MPLS network system according to claim 1, wherein the source identifying information and the destination identifying information are a source address and a destination address.

4. An MPLS network system according to claim 1, wherein said first edge node further includes a label attaching module assembling the MPLS frame by attaching, to the forwarding target frame, at least one of a forwarding target frame switching label and a VPN identifying label as the MPLS header used in the MPLS network, and
said second edge node further includes a label removal module removing the label attached as the MPLS header to the forwarding target frame.

5. An MPLS network system according to claim 1, wherein said embedding module in said first edge node embeds the key value generated by said generation module into a specified field in at least one Shim header as the MPLS header.

6. An MPLS network system according to claim 5, wherein said embedding module in said first edge node embeds the key value into a location, having a predetermined length, of the specified field in the Shim header that is rewritable when the MPLS frame is forwarded across within the MPLS network.

7. An MPLS network system according to claim 1, wherein said embedding module in said first edge node embeds the key value generated by said generation module into a specified field in one exclusive header as the MPLS header among a plurality of Shim headers.

8. An MPLS network system according to claim 1, wherein said second edge node further includes a notifying module notifying said first edge node of an embedded location in the specified field of the MPLS header, into which to embed the key value for determining the allocating destination link, when building a label switched path for the MPLS frame in the MPLS network.

9. An MPLS network system according to claim 8, wherein said first edge node further includes a storage module storing the embedding location in the specified field of the MPLS header, into which the key value for determining the notified allocating destination link is embedded.

10. An MPLS network system according to claim 1, wherein said second edge node further includes a notifying module notifying a core node on an MPLS frame label switched path and said first edge node, of an embedded location in the specified field of the MPLS header, into which the key value for determining the allocating destination link is embedded, when building a label switched path for the MPLS frame in the MPLS network.

11. An MPLS network system according to claim 10, wherein said core node and said first edge node each further includes a storage module storing the embedding location in the specified field of the MPLS header, into which the key value for determining the notified allocating destination link is embedded.

12. An MPLS network system according to claim 1, wherein said determining module in said second edge node determines one physical link as the allocating destination link among the plurality of physical links that are logically bundled beforehand as one link on the basis of a link value of the key value for determining the allocating destination link that has been extracted by said extraction module and a value obtained from the specified field in the MPLS header.

13. An MPLS network system according to claim 1, further comprising a core node including:
an extraction module extracting the key value from the specified field in the MPLS header of the MPLS frame received via the MPLS network; and
a determining module determining one physical link as the allocating destination link among the plurality of physical links that are logically bundled beforehand as one link on the basis of the key value extracted by said extraction module.

14. An edge node belonging to a first network and connected to a second network or a terminal device via physical links logically bundled, the node comprising:
a module extracting a key value from a packet header of a packet that is received from an ingress edge node also belonging to the first network; and
a module allocating the packet to one of the physical links on the basis of the key value calculated based on the packet header and stored in the packet header by the ingress edge node.

15. An edge node comprising:
a generation module generating a key value for determining an allocating destination link in a way that uses, as input values, a piece of source identifying information and a piece of destination identifying information contained in a header of a forwarding target frame before being attached with an MPLS header enabling the frame to be forwarded across within an MPLS network on the basis of an MPLS protocol;
an embedding module embedding the key value generated by said generation module into a specified field in the MPLS header;
a transmitting module transmitting the MPLS frame containing the key value embedded into the specified field in its MPLS header to the MPLS network;

an extraction module extracting the key value from the specified field in the MPLS header of the MPLS frame received via the MPLS network; and a determining module determining one physical link as the allocating destination link among a plurality of physical links that are logically bundled beforehand as one link on the basis of the key value extracted by said extraction module.

16. An edge node according to claim 15, wherein said generation module generates, as a key value for determining the allocating destination link, a pseudo random number obtained as a result of performing a calculation using a one-way function in a way that uses, as input values, the source identifying information and the destination identifying information contained in the header of the forwarding target frame.

17. An edge node according to claim 15, wherein the source identifying information and the destination identifying information are a source address and a destination address.

18. An edge node according to claim 15, further comprising a label attaching module assembling the MPLS frame by attaching, to the forwarding target frame, at least one of a forwarding target frame switching label and a VPN identifying label as the MPLS header used in the MPLS network; and a label removal module removing the label attached as the MPLS header to the forwarding target frame.

19. An edge node according to claim 15, wherein said embedding module embeds the key value generated by said generation module into a specified field in at least one Shim header as the MPLS header.

20. An edge node according to claim 19, wherein said embedding module embeds the key value into a location, having a predetermined length, of the specified field in the Shim header that is rewritable when the MPLS frame is forwarded across within the MPLS network.

21. An edge node according to claim 15, wherein said embedding module embeds the key value generated by said generation module into a specified field in one exclusive header as the MPLS header among a plurality of Shim headers.

22. An edge node according to claim 15, further comprising a notifying module notifying other node on an MPLS frame label switched path of an embedded location in the specified field of the MPLS header, into which to embed the key value for determining the allocating destination link, when building a label switched path for the MPLS frame in the MPLS network.

23. An edge node according to claim 22, further comprising a storage module storing the embedding location in the specified field of the MPLS header, into which the key value for determining the notified allocating destination link is embedded.

24. An edge node according to claim 15, wherein said determining module determines one physical link as the allocating destination link among the plurality of physical links that are logically bundled beforehand as one link on the basis of a link value of the key value for determining the allocating destination link that has been extracted by said extraction module and a value obtained from the specified field in the MPLS header.

25. A method of determining an allocating destination link, comprising:

generating a key value for determining an allocating destination link in a way that uses, as input values, a piece of source identifying information and a piece of destination identifying information contained in a header of a forwarding target frame before being attached with an MPLS header enabling the frame to be forwarded across within an MPLS network on the basis of an MPLS protocol;

embedding the generated key value into a specified field in the MPLS header; and transmitting the MPLS frame containing the embedded key value into the specified field in its MPLS header to the MPLS network;

extracting the key value from the specified field in the MPLS header of the MPLS frame received via the MPLS network; and determining one physical link as the allocating destination link among a plurality of physical links that are logically bundled beforehand as one link on the basis of the extracted key value.

26. A method of determining an allocating destination link according to claim 25, further comprising embedding the generated key value into a specified field in at least one Shim header as the MPLS header.

27. A method of determining an allocating destination link according to claim 26, further comprising embedding the key value into a location, having a predetermined length, of the specified field in the Shim header that is rewritable when the MPLS frame is forwarded across within the MPLS network.

28. A method of determining an allocating destination link according to claim 25, further comprising embedding the generated key value into a specified field in one exclusive header as the MPLS header among a plurality of Shim headers.

29. A method of determining an allocating destination link according to claim 25, further comprising notifying a node on an MPLS frame label switched path of an embedded location in the specified field of the MPLS header, into which to embed the key value for determining the allocating destination link, when building the label switched path for the MPLS frame in the MPLS network.

30. A method of determining an allocating destination link according to claim 29, further comprising storing the embedding location in the specified field of the MPLS header, into which the key value for determining the notified allocating destination link is embedded.

31. A method of determining an allocating destination link according to claim 25, further comprising determining one physical link as the allocating destination link among the plurality of physical links that are logically bundled beforehand as one link on the basis of a link value of the extracted key value for determining the allocating destination link and a value obtained from the specified field in the MPLS header.

* * * * *